US009647992B2

(12) United States Patent
Widergren et al.

(10) Patent No.: US 9,647,992 B2
(45) Date of Patent: *May 9, 2017

(54) SECURE TRANSFER AND TRACKING OF DATA USING REMOVABLE NONVOLATILE MEMORY DEVICES

(71) Applicant: MO-DV, INC., Campbell, CA (US)

(72) Inventors: Robert D. Widergren, Campbell, CA (US); Martin Paul Boliek, San Francisco, CA (US)

(73) Assignee: MO-DV, INC., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/295,971

(22) Filed: Jun. 4, 2014

(65) Prior Publication Data

US 2014/0289514 A1 Sep. 25, 2014

Related U.S. Application Data

(63) Continuation of application No. 13/231,764, filed on Sep. 13, 2011, now Pat. No. 8,751,795.

(Continued)

(51) Int. Cl.
*H04L 29/06* (2006.01)
*G06F 21/60* (2013.01)
*G06F 21/10* (2013.01)

(52) U.S. Cl.
CPC .......... *H04L 63/0428* (2013.01); *G06F 21/10* (2013.01); *G06F 21/606* (2013.01)

(58) Field of Classification Search
CPC ..... G06F 21/10; G06F 21/606; H04L 63/0428
See application file for complete search history.

(56) References Cited

U.S. PATENT DOCUMENTS 5,015,886 A 5/1991 Choi et al.
5,584,023 A 12/1996 Hsu
(Continued)

FOREIGN PATENT DOCUMENTS

WO WO-2008012699 1/2008

OTHER PUBLICATIONS

Humphries, M., "Wink—the smallest 16GB USB flash drive available," Geek.com. Web. Nov. 16, 2009.*

(Continued)

*Primary Examiner* — Kari Schmidt
(74) *Attorney, Agent, or Firm* — Blakely, Sokoloff, Taylor & Zafman LLP

(57) ABSTRACT

A protected memory source device including removable non-volatile memory durably stores a signature such as a serial number or identifier, which is used to mark protected multimedia content legally stored on the protected memory device. The protected multimedia content is moved from the source device to another device, such as a target device used to aggregated protected content in a library. Moving the protected multimedia content involves replacing a source-specific header, comprising digital rights management metadata and/or other security metadata allowing only a device having the source device signature access to the content, with a target-specific header comprising digital rights management metadata and/or other security metadata allowing only a device having the target device signature access to the content. The transfer is done using one of a variety of transfer methods with either a trusted or un-trusted host system connecting the source device to the target device.

8 Claims, 11 Drawing Sheets

Related U.S. Application Data

(60) Provisional application No. 61/382,877, filed on Sep. 14, 2010.

(56) References Cited

U.S. PATENT DOCUMENTS

| | | | |
|---|---|---|---|
| 5,677,953 A | 10/1997 | Dolphin | |
| 5,812,204 A | 9/1998 | Baker et al. | |
| 5,828,897 A | 10/1998 | Kirsch et al. | |
| 5,923,757 A | 7/1999 | Hocker et al. | |
| 5,936,945 A | 8/1999 | Shibata et al. | |
| 5,940,506 A | 8/1999 | Chang et al. | |
| 6,041,386 A | 3/2000 | Bello | |
| 6,052,711 A | 4/2000 | Gish | |
| 6,079,047 A | 6/2000 | Cotugno et al. | |
| 6,233,347 B1 | 5/2001 | Chen et al. | |
| 6,240,184 B1 | 5/2001 | Huynh et al. | |
| 6,285,398 B1 | 9/2001 | Shinsky et al. | |
| 6,295,645 B1 | 9/2001 | Brewer | |
| 6,385,667 B1 | 5/2002 | Estakhri et al. | |
| 6,396,937 B2 | 5/2002 | Chen et al. | |
| 6,400,826 B1 | 6/2002 | Chen et al. | |
| 6,499,056 B1 | 12/2002 | Kitamura et al. | |
| 6,590,604 B1 | 7/2003 | Tucker et al. | |
| 6,665,201 B1* | 12/2003 | Spencer | G11C 11/005 361/728 |
| 6,735,676 B1 | 5/2004 | Kanda et al. | |
| 6,820,055 B2 | 11/2004 | Saindon et al. | |
| 6,904,493 B2 | 6/2005 | Chiao et al. | |
| 6,993,509 B2 | 1/2006 | Vidich et al. | |
| 7,009,655 B2 | 3/2006 | Huang | |
| 7,295,608 B2 | 11/2007 | Reynolds et al. | |
| 7,337,332 B2* | 2/2008 | Tsuria | G06F 21/10 380/281 |
| 7,584,347 B2* | 9/2009 | El-Haj-mahmoud | G06F 9/4408 713/1 |
| 7,669,121 B2* | 2/2010 | Kiilerich | G06F 17/30569 715/249 |
| 7,971,017 B1* | 6/2011 | Mann | G06F 21/123 705/51 |
| 8,363,258 B2* | 1/2013 | Suzuki | H04N 7/1675 358/1.15 |
| 8,387,150 B2* | 2/2013 | Schnell | G06F 21/10 380/241 |
| 2002/0025141 A1 | 2/2002 | Matsumoto et al. | |
| 2004/0010687 A1* | 1/2004 | Futa | H04N 5/76 713/168 |
| 2004/0052233 A1 | 3/2004 | Skog et al. | |
| 2004/0054914 A1* | 3/2004 | Sullivan | G06F 21/602 713/189 |
| 2004/0165603 A1* | 8/2004 | D'Angelo | H04L 12/5835 370/401 |
| 2004/0228169 A1 | 11/2004 | Widergren | |
| 2005/0005149 A1 | 1/2005 | Hirota et al. | |
| 2005/0010690 A1* | 1/2005 | Marshall | H04L 29/06 709/246 |
| 2005/0216548 A1 | 9/2005 | Wormington et al. | |
| 2006/0150257 A1* | 7/2006 | Leung | G06F 21/10 726/27 |
| 2006/0202232 A1 | 9/2006 | Takami | |
| 2007/0008422 A1 | 1/2007 | Huang | |
| 2008/0044032 A1* | 2/2008 | Lou | H04L 63/0442 380/284 |
| 2008/0046745 A1* | 2/2008 | Buch | H04L 29/06027 713/176 |
| 2008/0148060 A1* | 6/2008 | Thorell | G06F 21/51 713/187 |
| 2008/0214300 A1* | 9/2008 | Williams | G06F 21/125 463/29 |
| 2008/0294901 A1* | 11/2008 | Farrugia | G06F 21/10 713/176 |
| 2009/0013183 A1* | 1/2009 | Sato | G06F 21/10 713/169 |
| 2009/0187772 A1* | 7/2009 | Lange | G06F 21/10 713/193 |
| 2010/0005301 A1* | 1/2010 | Asano | G06F 21/10 713/171 |
| 2010/0027797 A1* | 2/2010 | Nakamura | G11B 20/00086 380/277 |
| 2010/0031018 A1* | 2/2010 | Kurihara | G06F 21/10 713/153 |
| 2010/0077206 A1* | 3/2010 | Lee | G06F 21/10 713/153 |
| 2010/0174908 A1* | 7/2010 | DiSanto | H04L 9/0891 713/171 |
| 2013/0067223 A1 | 3/2013 | Hiroyuki et al. | |

OTHER PUBLICATIONS

M. E. Borda, "Digital rights protection—a great challenge of the new millennium," TELSIKS 2005—2005 uth International Conference on Telecommunication in ModernSatellite, Cable and Broadcasting Services, 2005, pp. 207-214 vol. 1.*

Tsolis, Dimitrios K., and Theodore S. Papatheodorou. "Web services for digital rights management and copyright protection in digital media." Proceedings of the 3rd international conference on Digital Interactive Media in Entertainment and Arts. ACM, 2008. pp. 241-247.*

Hirai, T., "Content protection technology for a novel removable drive", Magnetics, IEEE Transactions, (Feb. 2005), 860-869.

Koenen, R. H., et al., "The long march to interoperable digital rights management", Proceedings of the IEEE, vol. 92, No. 6, (Jun. 2004), 883, 897.

MO-DV, Inc., International search report and written opinion for PCT/US2011/051587, (Dec. 22, 2011).

MO-DV, Inc., International Search Report and Written Opinion for PCT/US2010/039911, (Dec. 10, 2010).

MO-DV, Inc., International Search Report and Written Opinion for PCT/US2005/15269, (Dec. 18, 2006).

Toshiba Press Releases, "Toshiba's SD-Card-Based Digital Rights Management Systems Opens Up Full Potential of Digital Content Distribution Market", (Jul. 17, 2003).

* cited by examiner

US 9,647,992 B2

SECURE TRANSFER AND TRACKING OF DATA USING REMOVABLE NONVOLATILE MEMORY DEVICES

RELATED APPLICATIONS

This application is a continuation of U.S. patent application Ser. No. 13/231,764, "Secure Transfer and Tracking of Data Using Removable Nonvolatile Memory Devices", filed Sep. 13, 2011, which claims priority to U.S. Provisional Patent Application No. 61/382,877, "Secure Transfer and Tracking of Data Using Removable Non-Volatile Memory Devices," filed Sep. 14, 2010, which is incorporated herein by reference.

This application is related to U.S. Provisional Patent Application No. 61/221,029, "Accessing a Serial number of a Removable Non-Volatile Memory Device," filed Jun. 26, 2009, and is also related to "Multimedia Storage Systems and Methods" U.S. Pat. No. 7,508,943, filed May 17, 2004, both of which are incorporated herein by reference.

TECHNICAL FIELD

The disclosed embodiments relate generally to acquiring, aggregating, and disseminating secure content using removable non-volatile memory devices, with serial numbers, digital rights management metadata and/or other security metadata, and other security measures.

BACKGROUND

Multimedia memory cards (MMCs) and other storage card formats are well known today as a means of providing external memory capacity for storing information of interest to a user. Such cards are typically used in portable devices such as cellular phones, personal digital assistants (PDA), digital cameras, etc. to store data and can be connected to a general purpose personal computer. However, these devices are notorious for lack of security. Once a file is copied onto one of these devices, it cannot be tracked, there is no copy prevention, and there is no assurance that the memory device to which the file is copied contains no malicious software (sometimes called malware).

SUMMARY

The present invention overcomes the limitations and disadvantages described above by providing methods, systems, and computer program products for securely transferring content.

The following presents a summary of certain embodiments in order to provide a basic understanding of some of the aspects of the invention. It is not a complete description or overview of the invention.

Multiple embodiments are presented that securely transfer multimedia content files from one device (the source device) to another (the target device). The source device is the original location of the content, while the target device is the destination of the content. In some embodiments, after the transfer, both the source and the target have a copy of the content, while in other embodiments after the transfer, the content is removed from the source such that only the target contains the content. In some embodiments, a computer-implemented method of securely transferring content with digital rights management metadata, and/or other security metadata, is performed on a source device having one or more processors and memory storing one or more programs which when executed by the one or more processors cause performance of the following method. A target device signature is received from a target device. The source device accesses a content file having encrypted content and a source-specific header configured to allow only a device having a source device signature access to the encrypted content. Then the source device creates for the content file a target-specific header allowing only a device having the target device signature access to the content. It encrypts the target-specific header. It also transfers at least the encrypted content of the content file to the target device. Either separately or along with the encrypted content, it transfers the encrypted target-specific header to the target device.

In some embodiments, a computer-implemented method of securely transferring content with digital rights management metadata, and/or other security metadata, is performed on a target device having one or more processors and memory storing one or more programs which when executed by the one or more processors cause performance of the following method. A source device signature is securely received from a source device. A content file having encrypted content associated with a source-specific header configured to allow only a device having the source device signature access to the encrypted content is also received from the source device. A target-specific header is created. In some embodiments, the target-specific header is created by using the source device signature to convert the source-specific header into an intermediate header and using a target device signature to convert the intermediate header into the target-specific header. The target-specific header is configured to allow only a device having the target device signature access to the content. The target-specific header enables the target device to access the encrypted content of the content file. The content file and the target-specific header are stored in the target device. In some embodiments, the target-specific header is stored on the target device as part of the content file, while in other embodiments the content file and the target-specific header are stored separately.

In yet other implementations, a computer-implemented method of transferring content with digital rights management metadata, and/or other security metadata, from a source device to a target device, is performed on a host system having one or more processors and memory storing one or more programs which when executed by the one or more processors cause performance of the following method. The host receives a source device signature from a source device. It also receives from the source device a content file having encrypted content associated with a source-specific header configured to allow only a device having a source device signature access to the encrypted content. A target device signature is received from a target device. A target-specific header is created for the content file. In some embodiments, the target-specific header is created by using the source device signature to convert the source-specific header into an intermediate header and using the target device signature to convert the intermediate header into the target-specific header. The target-specific header is configured to allow only a device having the target device signature access to the content. The target-specific header is then stored so that the encrypted content of the content file is accessible to the target device. In some embodiments, the source-specific header of the content file is replaced with the target-specific header. Then the content file having encrypted content and the target-specific header is transferred to the target device.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures. Optional operations or components are indicated by dashed lines in the figures.

DESCRIPTION OF EMBODIMENTS

Figure 1:
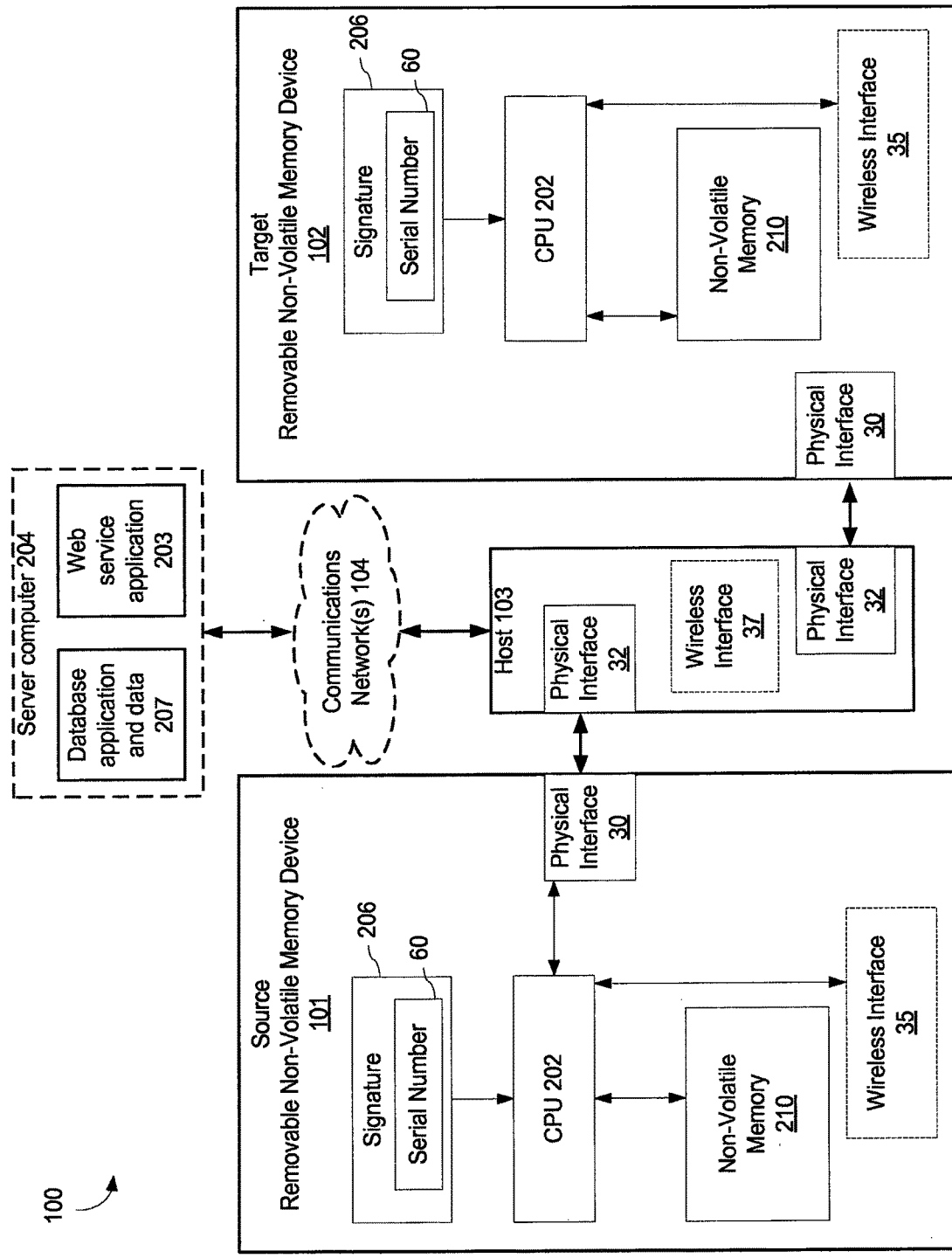
FIG. 1 is a block diagram illustrating an example of a multimedia storage and access system, in accordance with one embodiment.

Methods and systems for securely transferring content from one non-volatile memory device to another are described. Reference will be made to certain embodiments of the invention, examples of which are illustrated in the accompanying drawings. The description of some embodiments is not intended to limit the invention to these particular embodiments alone. On the contrary, the invention is intended to cover alternatives, modifications and equivalents that are within the spirit and scope of the invention as defined by the appended claims.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well-known to those of ordinary skill in the art are not described in detail to avoid obscuring aspects of the present invention.

As stated in the background, traditional non-volatile memory devices such as USB memory devices, smart cards, and multimedia cards, are notorious for lack of security. Once a file is copied onto one of these devices, it typically cannot be tracked, there is typically no copy prevention, and typically there is no assurance that the memory device contains no malware.

Digital Rights Management (DRM) has the goal of assuring that the ownership of digital content files is respected. Additionally, or instead, other digital security techniques can be used to assure secure access, data integrity, and/or provide tracking and auditing functions. Several means are used to achieve this including preventative security and access prevention techniques such as data encryption (e.g., symmetric key cryptography, public key cryptography) as well as access verification and tracking techniques such as hashing, watermarks, stenography, and logging. DRM technology is commonly used to protect multimedia content in closed systems such as Blu-Ray and other DVD players. However, using DRM techniques to limit access to content stored on non-volatile memory devices such as flash memory drives has proven to be difficult.

To better access and control the content on these non-volatile memory devices, Robert Widergren in "Multimedia Storage Systems and Methods" U.S. Pat. No. 7,508,943, filed May 17, 2004, incorporated herein by reference, taught how to access multimedia content with different devices using a number of auto-loading programs located on the card. To provide authentication of the non-volatile memory device, Robert Widergren in "Accessing a Serial Number of a Removable Non-Volatile Memory Device," U.S. Provisional Application No. 61/221,029, Filed Jun. 26, 2009, incorporated herein by reference, taught how to extract the manufacturer's serial number from a memory device and then use the serial number to authenticate content stored on the non-volatile memory device.

This document discloses new methods and apparatus for preserving DRM and other data integrity and security functions for content that is taken from, placed on, or moved between non-volatile memory devices.

The embodiments described below concern devices, systems, and methods in which multimedia content stored on a memory card is "protected" using a digital signature, often herein called a device signature when the digital signature is associated with a particular device or set of devices. The digital signature or device signature is digital data that is used for unique identification. What is identified is application specific. In some embodiments, the signature is the serial number of a specific protected memory device (PMD), or set of PMDs; alternatively the signature is derived from these serial numbers. In yet other implementations, the device signature is the public key for the source or target device. Any digital device can have a device signature. Device signatures can be protected in many different ways, depending on the application and threat. For example, device signatures may be hardwired in hardware to prevent erasure. In another example, the device signature can be stored in a portion of memory accessible only to the device's CPU, requiring a host device to interact with the device CPU to acquire the device signature. In yet another example, the device signature may be remotely stored (either uniquely or redundantly), for example on a host system accessible via the Internet or other communications network or communication channel, to ensure data persistence.

In an example of the usage of a device signature, one or more aspects of the multimedia content stored on a memory card are arranged to prevent decoding or playing of the multimedia content if the multimedia content is copied to another device having a different device signature or if the multimedia content is copied to another type of device altogether (e.g., the disk drive or other non-volatile storage of a host device) that has no authorized device signature. In some embodiments, the multimedia content is protected by encrypting or encoding it using a key or methodology that depends on the serial number of the memory device. In other embodiments, another protection scheme is used, such as storing the serial number in the header of a file that contains the multimedia content, and encoding the multimedia content so that only a proprietary player can play the multimedia content or only a proprietary decoder can decode the multimedia content. In these embodiments, the proprietary player or decoder is configured to determine whether the serial number in the file header of the multimedia content file is consistent with the serial number of the memory card, and enables the multimedia content to be played or decoded only when the two are consistent. In these embodiments, a proprietary player or decoder, usually software stored on a protected memory device (PMD) and executed either on the PMD or on the host, authenticates whether the content is legitimate on a specific PMD and enables the multimedia content to be played or decoded only after authentication.

Optionally, a source or target device (PMD) has more than one signature stored in or otherwise embedded in the device. Different signatures are used for different applications or to protect different content stored on the device. However, in most implementations, there is only one serial number on a PMD.

There are legitimate reasons to copy or move content from one memory device to another. For example, multimedia content might be sold and distributed with one movie or one album on a protected memory device (PMD). The user may be allowed to aggregate content owned on various single-album PMDs onto one high-capacity PMD, creating a "library" of content. The library is thus easier to transport and manage than a multitude of single-album PMDs. Another example is downloading secure data from a database for access in a mobile device. In clinical health care applications, care providers may want to use mobile devices pre-loaded with patient information. Similarly, the patient may want to control, retain, or transfer personal health records. In both cases, the DRM and tracking functions on a PMD limit the risk that the data will be lost or stolen, even though it is outside the database. In another example, personal or business financial data applications can load private data on a PMD to obtain the advantages of data security, integrity, and tracking provided by the PMD and its security mechanisms. Likewise, any personal or business private data can be transferred (e.g., to a target PMD) using the methods described in this document.

In order to achieve secure transfer of content from one PMD to another, from a PMD to another device, or to a PMD from another device, unauthorized copying of the content is disallowed or the transfer results in content that cannot be decoded or played. Also, validation of legitimate content is performed. In some embodiments, the validation is completed using the resources in the PMD itself without the need for external validation. In some embodiments the validation takes place in the source PMD, the PMD originally holding an authorized copy of the content. In other embodiments, the validation takes place in the target PMD, such as a library PMD, which will ultimately receive the authorized content. In still other embodiments, the validation takes place in using a trusted host device between the host PMD and the target PMD. Some embodiments also include a network connection to assist in the validation or tracking procedures. For example, the network can be used for tracking and reporting of the content's whereabouts and usage. In some embodiments, tracking details are recorded on the PMDs and/or the host device. Then the tracking details are transferred to a server when a network connection to the server becomes available. In some embodiments, this system also has the ability to confirm the disablement or deletion of content. For example, in some implementations or in some situations (e.g., the user does not have the right to make additional copies), after the content has been securely transferred from the source PMD to the target PMD, the copy on the source device is deleted or disabled.

The embodiments described here support these properties to varying levels of security. The level of security required, and the specific embodiment to be employed, is determined by the application.

FIG. 1 is a block diagram illustrating an example of a multimedia content storage and retrieval system 100 according to one embodiment. FIG. 1 shows various functional components that will be referred to in the detailed discussion that follows. This system 100 includes a protected memory device (PMD) having non-volatile memory storage that stores an authorized and protected copy of a content file. It is known as the source device 101. This system 100 also includes a protected memory device (PMD) having non-volatile memory storage that is authorized to receive a protected copy of a content file. It is known as the target device 102. In some embodiments, both source device 101 and target device 102 are protected memory devices. In some embodiments, source device 101 is a protected memory device, while target device 102 is not, and instead target device 102 is a computer, a personal digital assistant, a cellular phone, or the like. Similarly, in some embodiments, target device 102 is a protected memory device while source device 101 is not, and instead source device 101 is a computer, personal digital assistant, cellular phone, or the like.

System 100 also includes a host electronic system 103 used to connect source device 101 and target device 102 to one another. In some embodiments, host 103 is a trusted host which plays an active role in the secure data transfer process, as discussed with respect to FIGS. 5A-5B. In other embodiments, host 103 is an un-trusted host that facilitates the data transfer without decrypting confidential information at the host, as discussed with respect to FIGS. 3A-3B and 4A-4B.

In some embodiments, source device 101, target device 102, and host electronic system 103 include physical interfaces 30 and 32, respectively, for removably interconnecting PMD devices 1021103 and host electronic system 103. In other embodiments, these devices communicate by means of wireless interfaces 35 and 37, respectively. Although not shown in FIG. 1, either source device 101, or target device 102, or both, can be connected to host electronic system 103 via an intermediate device, such as a cell phone, adapter. Alternatively, either source device 101, or target device 102, or both, are connected to host electronic system 103 via a communications network (e.g., communications network 104) or other communication channel. The connection between source device 101 and host 103, and the connection between target device and host 103 need not be the same. These connections may include connector sockets, wired adaptors, or other physical connection via interfaces 30, 32. Alternatively, one or both of source device 101 and target device 102 is connected wirelessly to the host 103 via wireless interface 35/37 using a wireless data transmission protocol (e.g., Bluetooth, Ultra Wide Band, WiFi, IrDA, RF).

Source device 101 includes non-volatile memory 210, such as, flash memory. In some embodiments, non-volatile memory 210 includes one or more nonvolatile memory chips that can be programmed by a user. Once programmed, the storage memory retains its data until over-written or erased. Contents of memory 210 are discussed with reference to FIG. 2. According to some embodiments, storage device 101 also durably stores a manufacturer assigned serial number 60. Typically, the manufacturer assigned serial number 60 includes a sequence of alpha-numeric characters that identify the source device 101. The manufacturer assigned serial number 60 is sometimes called an identifier.

In some embodiments, the manufacturer assigned serial number 60 is stored in a hardware register of the source device 101. In most embodiments, the serial number 60 cannot be over-written or erased. Further, in some embodiments, the serial number 60 is unique to the source device 101. In other embodiments, however, the manufacturer of the source device 101 may reuse serial numbers when manufacturing large numbers of PMDs, such that the manufacturer assigned serial number 60 is relatively unique to the source device 101. For example, if a million distinct serial numbers are used in (and distributed over) hundreds of millions of PMDs, that may be sufficient to prevent large scale unauthorized copying of content from PMDs to other PMDs. In this example, the serial number stored in each PMD is still considered to be a device-specific serial number, even though a few hundred other PMDs may also have the same serial number.

Source device 101 includes a device signature 206, typically assigned by the manufacturer of source device 101. Typically, device signature 206 includes a sequence of alpha-numeric characters that identify source device 101. In some embodiments, serial number 60 is directly or indirectly used as device signature 206. In some implementations, device signature 206 is the serial number 60. In other implementations, device signature 206 is a value that is a predefined function of serial number 60, such as the value produced by applying a predefined hash function to serial number 60 or a value corresponding to the serial number 60 (e.g., a predefined portion of the serial number, the serial number appended to a fixed value, etc.). In other embodiments, device signature 206 is a value that is not related to serial number 60. For example, in some embodiments device signature 206 is derived from the device's private key, other identifiers of the non-volatile memory storage device, or is an independently generated value (e.g., a string of numbers, letters and/or other characters) assigned by the manufacturer. Device signature 206 is used (a) in validating content to be accessed by source device 101, and (b) in validating the source device itself.

Figure 2:
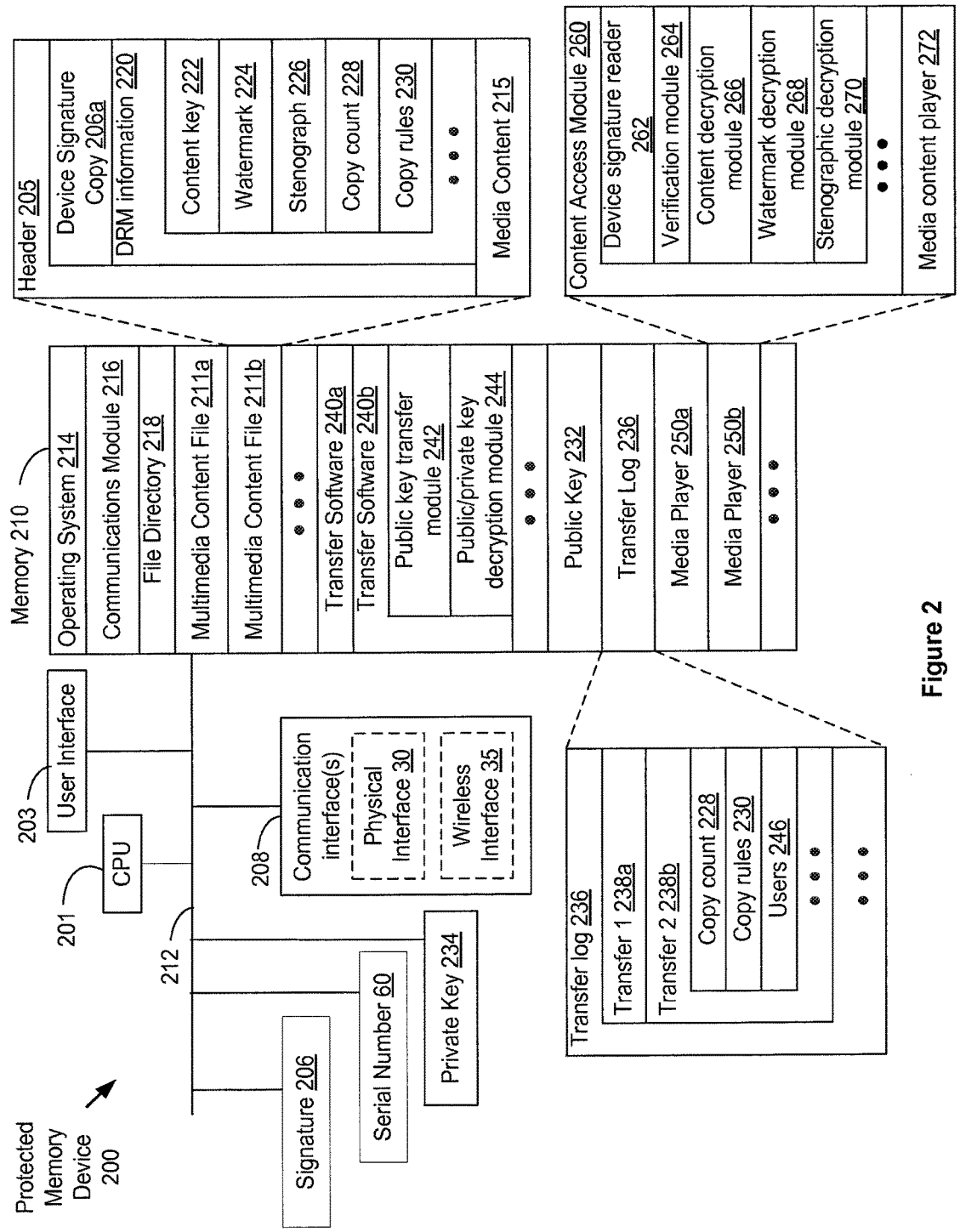
FIG. 2 is a block diagram illustrating an example of a protected memory device.

Source device 101 also includes a central processing unit 202 which includes various versions of transfer software, discussed with respect to FIG. 2. Central processing unit 202 communicates with host electronic system 103 via physical interface 30 or wireless interface 35 to allow access to non-volatile memory 210.

Target device 102 contains the same elements discussed above with respect to host device 101 including a device specific serial number 60, signature 206 as well as nonvolatile memory 210, a central processing unit 202, a physical interface 30, and/or a wireless interface 35 which allows communication between the target device 102 and the host 103.

The source device 101 and the target device 102 are preferably protected memory devices (PMDs) having non-volatile memory storage. However, III some embodiments the source device 101 is a device or system having an optical disc that stores content, a hard disk (internal to a computer, or external to the host) that stores content, or a network web service that streams the content. Similarly, in some embodiments, the target device 102 is a device or system having an optical disc that stores content, a hard disk (internal to a computer, or external to the host) that stores content, or a network web service that streams the content.

Host electronic system 103 can be any of a number of devices (e.g., an internet kiosk, personal digital assistant, cell phone, gaming device, handheld GPS, digital media player, electronic book reader, desktop computer, or laptop computer) used to enable the activities described below. The host electronic system 103 includes one or more physical interfaces 32 and one or more wireless interfaces 37. It should be noted that in embodiments where the host 103 includes only one physical interface 32, the source device 101 and target device 102 take turns plugging into the host's physical interface 32. In such embodiments, the host will buffer the content after reading it from one PMD and then will write the content to the next PMD when it is connected. In some embodiments, the host 103 is capable of buffering/storing several content files simultaneously for bulk transfer. The number of times the PMD devices 10211 03 are plugged and unplugged depends on the data transfer method; different data transfer methods are discussed below with respect to FIGS. 3A-5B. The host electronic system 103 optionally includes audio and/or video inputs (e.g., a microphone and a video camera), audio output (e.g., speakers or headphones), and video output (e.g., a display) (not shown). In some embodiments, the host electronic system 103 is capable of connecting several sources and/or targets simultaneously. In some embodiments, a number of content files are batched for simultaneous transfer. Additionally, in some embodiments, upon verification that the source copy includes sufficient replication rights, the host is capable of connecting to a plurality of PMD target devices so that they can be simultaneously written with the same content. As explained below, in some embodiments the host electronic system 103 is connected to (or intermittently connected to) a communications network, which allows it to upload and download information such as a transfer log and other information discussed below. The host electronic system 103 is further discussed with reference to FIG. 6.

In some embodiments, the host electronic system 103 is connected (or intermittently connected) to a communications network 104. The communications network(s) 104 can be on a local network, a wide-area network, cell phone or telephone network, or on the Internet. The server computer 204 in this example includes a web service application 203 and a database application 207. The web service application 203 is software running on the server computer 204 that has access to a database application 207 and data thereon. The web service application 203, while not essential, can provide many functions to the system. In some embodiments, it is stored on the source device 101 or target device 102. More commonly, the web service application 203 offers authentication of the source, target, and/or host device, for collection of metadata for logging, tracking, analytics, and/or verifying secure deletion. In some embodiments, the web service application 203 also acts as a trusted computational resource. In other embodiments, the web service may send and receive updates of the log information collected at the source, target, and host devices.

FIG. 2 is a block diagram illustrating a protected memory device (PMD) 200 such as a source device 101 or a target device 102, according to some embodiments. In some embodiments the PMD devices have a form factor that enables these devices to be hand held and easily transportable. Examples of PMD devices are USB flash memory devices (sometimes in the form of a memory card, memory stick or the like) laptop computer, tablet computer, phone, and personal digital assistant (PDA). In some embodiments, source device 101 is a device having non-volatile semiconductor memory storing one or more content files and having a size no greater than 8 cm by 2.5 cm by 1 cm. Similarly, in some embodiments target device 102 comprises a device having non-volatile semiconductor memory storing one or more content files and having a size no greater than 8 cm by 2.5 cm by 1 cm. Typically, PMDs 101/102 have one or more processors in the memory controller, and programs that are executed by the one or more processors. Thus, some or all of the processing operations needed (e.g., encryption, decryption, key management, watermarking, stenography, hashing, metadata logging, and even content encoding and decoding) for transferring protected content between a PMD and another device can be performed by the PMD.

The PMD 200 typically includes one or more processors (CPU's) 201 for executing modules, programs and/or instructions stored in memory 210, and one or more communication buses 212 for interconnecting these components. Execution of modules, programs and/or instructions by the one of more processors 201 enables performance of the operations described below (e.g., encryption, decryption, key management, metadata logging, content encoding and decoding, etc.) as being performed by the source or target PMD. PMD 200 optionally includes (but typically does not include) a user interface 203 having a display device and a keyboard (not shown). It should be noted that PMD 200 does not necessarily need a user interface 203 or even the computational ability to render the content that it holds. For example, in some embodiments, PMD 200 does not play or display the content, and instead merely acts as a repository of the content. The communication buses 212 may include circuitry (sometimes called a chipset) that interconnects and controls communications between system components. PMD 200 also durably stores a manufacturer assigned serial number 60 and/or a device signature 206, and typically at least one of serial number 60 and device signature 206 is stored in a secure location (e.g., a register) of PMD 200. Device signature 206 is used for authenticating PMD 200 and for securely storing content. Optionally, serial number 60 is directly or indirectly used as signature 206, and thus in some embodiments PMD 200 durably stores only one of serial number 60 and signature 206. Alternatively, PMD 200 durably stores a manufacturer assigned serial number 60 that is separate from device signature 206. The PMD 200 also includes one or more network or other communications interfaces 210 such as a physical interface 30 and/or a wireless interface 35.

Memory 210 includes non-volatile memory, such as one or more magnetic disk storage devices, optical disk storage devices, flash memory devices, or other non-volatile solid state storage devices and may also include high-speed random access memory, such as DRAM, SRAM, DDR RAM or other random access solid state memory. Memory 210, or alternately the non-volatile memory device(s) within memory 312, comprises a non-transitory computer readable storage medium. In some embodiments, memory 210 or the computer readable storage medium of memory 210 stores the programs, modules and data structures described below, or a subset thereof.

Memory 210 optionally stores an operating system 214 that includes procedures for handling various basic system services and for performing hardware dependent tasks. In some embodiments, however, the PMD 200 does not include an operating system 214.

Memory 210 stores a communications module 216 that includes one or more procedures for managing communications between the PMD 200 and a host electronic system 103 via the communications interface(s) 208 (physical or wireless).

Memory 210 optionally stores a file directory 218, which includes entries for the content files 211a-n stored on memory 210.

Memory 210 stores one or more content files 211 a-n, such as one or more multimedia content files (e.g., audio files, video files, and/or audio-video files). Content files 211 may include files other than multimedia content files, such as image files, text files, spreadsheets, databases, etc. Prior to being loaded into memory 210, content files 211a-n may be encoded and/or encrypted according to an appropriate scheme or schemes. For ease of discussion, the following description will assume that both encryption and encoding are applied to a given content file 211, although embodiments of the present invention contemplate application of only one of encoding or encryption, as appropriate.

A respective content file 211 includes content 215 (such as, audio content, video content, audio-video content, etc.) and header 205. More generally, a respective content file 211 includes content (e.g., information or data of any suitable type) 215 in addition to the header 205. In some embodiments, a device signature copy 206a or information corresponding to a respective device signature is included in header 205 of content file 211. When content 215 is to be played, decoded or otherwise accessed, the device signature copy 206a or corresponding information in header 205 is compared with the device signature 206 of the PMD 200 in which respective content file 211 is stored, and access is denied when the two do not match. This prevents unauthorized copies of content file 211 from being played, decoded or otherwise accessed. In the embodiments described here, if content file 211 is an authorized copy of the file, the device signature copy 260a or the information corresponding to device signature copy 206a in header 205 matches (or, more generally, is consistent with) the device signature 206 of the particular device 101/102 on which the content file 211 is stored.

Optionally, instead of (or in addition to) header 205 including a device signature copy 206a or information corresponding to a respective device signature, header 205 may be encrypted using a key comprising the device signature or information corresponding to the device signature. In this way, only a device having access to the device signature can decrypt header 205 and thereby gain access to content key 222, which is required for accessing (e.g., decrypting and/or decoding) content 215 in content file 211. Alternatively, header 205 may be encrypted using an encryption key that is independent of the device signature.

Header 205 may include other metadata, such as Digital Rights Management (DRM) information 220. In some embodiments, DRM information 220 includes values, rules or other information for restricting content transfer. For example, the DRM information 220 may include copy rules 230 that limit the number of times content 215 can be transferred, e.g., a number in the range 0 to N, where N is a positive integer. This limit is enforced by procedures and/or logic that utilize DRM information 220; in some implementations, the copy limit is propagated to the target PMD, decremented after every transfer and stored as a copy count 228. It should be noted that while DRM is sometimes used to manage copyrighted materials, other uses of DRM are anticipated in this application. For example, the data files being transferred could contain non-copyrighted material that is of a sensitive or personal nature. For example, the data files could be medical files.

In some embodiments, DRM information 220 requires a signature handshake, login, or metadata transfer with a web service application (203, FIG. 1) that tracks content transfers. In other embodiments, DRM information 220 requires an exchange with the web service application 203 to get permission for the transfer. This web service interaction might also entail a transaction. For example, the user could buy permission to copy the content to the target device 102.

In some embodiments, DRM information 220 restricts the type of target devices to which the content can be transferred. For example, only PMDs may be allowed for target devices 102. In some embodiments, certain devices may be allowed only a "read only" copy of the information, while other devices are allowed "read/write" access. Optionally, the DRM requires a signature handshake, login, or metadata transfer with the web service application that tracks content transfers. In some embodiments, DRM information 220 (e.g., copy count 228 and/or copy rules 230) dictate the disabling or removal of the content file 211 (or content 215 of content file 211) from the source PMD after transfer of the content to a target PMD. It should be noted, that because content 215 is only accessible by means of content header 205, content 215 can be disabled by the removal or alteration of content file header 205 or by complete removal of content file 211 itself from the source PMD.

Digital Rights Management (DRM) information 220 optionally includes a watermark 224 and or stenograph 226 which is encoded into content file 215. In some embodiments, this watermark and/or stenographic data must be recognized as correct before a transfer is allowed to take place. In this way each version of the content can be marked, allowing a pirated version to be traced back to its source. In some embodiments, new watermarks and/or stenographic data are required to be added or to replace the existing watermarks and/or stenographic data in the file to be transferred. As such, in order to access the content 215, the content 215 is decoded to recognize/identify, remove, add, or replace identifying watermarks and/or stenographic data (such as by associating it with a serial number corresponding to the new copy), as appropriate.

In some embodiments, the content file 211 comprises multimedia content 215 that has been encrypted using content key 222. The content key 222 is typically, but not necessarily, a random symmetric key that is not specific to the device. In some embodiments, each content file 211 has its own content key, while in other embodiments, all of the content on a particular device 200 or library is encrypted with the same content key.

Memory 210 stores one or more transfer software programs or modules (transfer software) 240a-n. Optionally, a respective transfer program or module 240 includes a public key transfer module 242 and a public/private key decryption module 244. In some embodiments, the transfer computations take place on the PMD 200, the computations being performed by the one or more processors 201 using transfer software 240. However, in other embodiments, the PMD does not contain a processor 210, or the processor 210 is not powerful enough to perform the computations required by transfer software 240, or an adequate host is present, and so the computations are performed at host electronic system 103 using transfer software 240 provided by the PMD. Alternatively, in some circumstances, even when the PMD is capable of performing the computations, the computations are still be performed at host electronic system 103. In these embodiments, the transfer software modules 240a-n include a plurality of software modules that are compatible with a variety of different types of host electronic systems to which the removable non-volatile memory storage device 10 III 02 may be coupled, and/or are compatible with respective different operating systems employable by host electronic system 103. In one example, transfer program 240a is compatible with a host electronic system that runs a MacOS® operating system, transfer program 240b is compatible with a host electronic system that runs a Windows® operating system, transfer program 240c is compatible with a host that runs an Android operating system, transfer program 240d is compatible with a host that runs a Windows CE operating system, transfer program 240e is compatible with a host that runs a Palm operating system, transfer program 240f is compatible with a host that runs a Unix based operating system, and so on. Optionally, transfer programs 240a-n include one or more programs written in one or more interpreted languages, such as Java, Python, Ruby, and Flash, which run on many operating systems. Accordingly, in some embodiments, memory 210 stores transfer software modules 240a-n that are compatible with a plurality of different commercially available host electronic systems, enabling the removable non-volatile memory storage device 10 III 02 to be used with a variety of devices.

In some embodiments, memory 210 of a respective PMD 200 also stores public key 232, which is unique to PMD 200. The corresponding private key 234 is stored elsewhere in the device, in a more secure and less accessible location than public key 232. For example, it may be stored in a register from which it can be used but not exported. In these embodiments, the public and private keys are used to transfer multimedia content files 200 safely, even while using an un-trusted host electronic system 103, as discussed with respect to FIGS. 3A-3B and 4A-4B.

Optionally, memory 210 also stores a transfer log 236. The transfer log 236 stores information about respective file transfers 238a-n. The information stored for each file transfer may include one or more of a copy count 228, DRM copy count rules 230, and information regarding the user(s) 246 involved in the transfer, as well as other pertinent data.

In some embodiments, memory 210 also stores one or more multimedia players 250a-n. Multimedia players 250a-n include a plurality of players that are compatible with different types of host electronic systems with which the removable non-volatile memory storage device 10 III 02 may be coupled, and/or are compatible with respective different operating systems employable by a host electronic system 103. In one example, multimedia player 250a is compatible with a host electronic system that runs a MacOS® operating system, multimedia player 250b is compatible with a host electronic system that runs a Windows® operating system, multimedia player 250c is compatible with a host that runs an Android operating system, multimedia player 250d is compatible with a host that runs a Windows CE operating system, multimedia player 250e is compatible with a host that runs a Palm operating system, multimedia player 250f is compatible with a host that runs a Unix based operating system, and so on. Optionally, players 250a-n include one or more players written in one or more interpreted languages, such as Java, Python, Ruby, and Flash, which run on many operating systems. Accordingly, in some embodiments, the device includes multiple multimedia players 250 compatible with a plurality of different commercially available host electronic systems, enabling removable non-volatile memory storage device 101/102 to be used with a variety of devices equipped to present visual and/or auditory information.

In some embodiments, upon coupling of the PMD 200 with a host electronic system 103, one of multimedia players 250a-n and/or transfer software 240 is automatically executed by host electronic system 103. For example, this may happen due to the automatic execution of an autoexec or auto-load program (not shown) stored in memory 210 of removable non-volatile memory storage device 10 III 02.

Execution of multimedia player 250 includes execution of content access module 260 by the host electronic system 103. Content access module 260 includes a device signature reader 262 for accessing device signature 206 of PMD 200. In some embodiments, device signature reader 262 executes a predefined sequence of file access commands so as to access a file (or other set of data) stored on PMD 200.

Optionally, a respective multimedia player 250 also includes one or more of: verification module 264 for verifying that content file 211 is an authorized copy, decryption module 266 for decrypting multimedia content, watermark decryption module 268 for decrypting a watermark in a file's content, stenographic decryption module 270 for decrypting stenographic information in a file's content, and content player 272 for rendering the multimedia content of the content file. For example, when the content file contains a movie, content player 272 may play the movie on a host device for viewing (and listening) by one or more users of the host device; when the content file contains an audio track or other audio program, content player 272 may play audio track or program on the host device. In some embodiments, each of the multimedia players 250a-n includes a respective different version of an content access module 260 (e.g., multimedia player 250a includes a different version of content access module 260 than multimedia player 250b). Similarly, in some embodiments, each of multimedia players 250a-n includes a respective different version of content player 272 (e.g., multimedia player 250a includes a different version of content player 272 than multimedia player 250b).

Each of the above identified elements may be stored in one or more of the previously mentioned memory devices, and corresponds to a set of instructions. The programs or modules, when executed by the one or more processors of device 101/102, or one or more processors of host electronic system 103, perform the functions or operations described elsewhere in this document. The above identified modules or programs (i.e., sets of instructions) need not be implemented as separate software programs, procedures or modules, and thus various subsets of these modules may be combined or otherwise rearranged in various embodiments. The above identified modules may be implemented using software, hardware, firmware, state machines, or combinations thereof. In some embodiments, memory 210 may store a subset of the modules and data structures identified above. Furthermore, memory 210 may store additional modules and data structures not described above.

Although FIG. 2 is intended more as functional description of various features than as a structural schematic of the embodiments described herein. In practice, and as recognized by those of ordinary skill in the art, some items shown separately could be combined and some items could be separated.

Figure 3A:
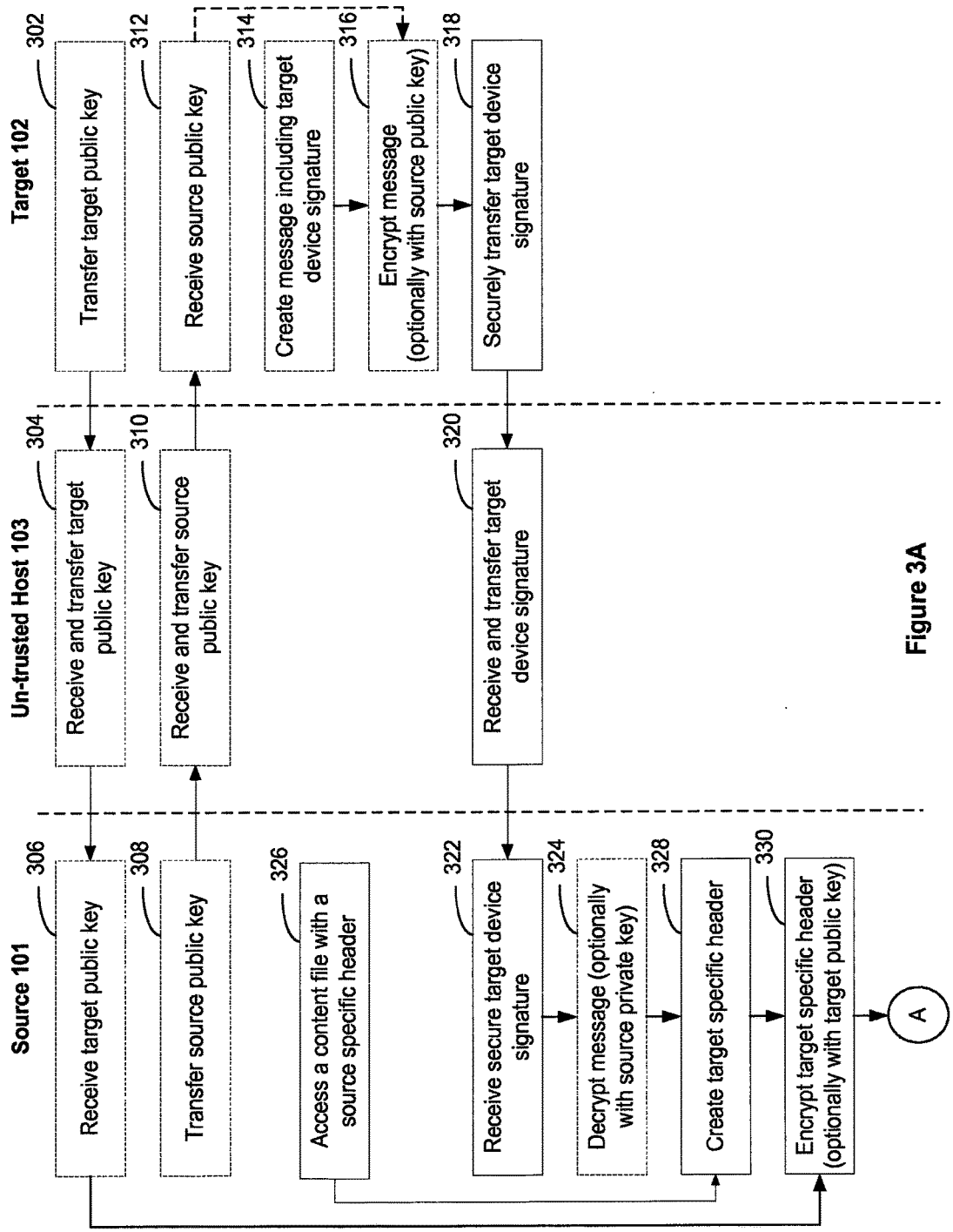
FIGS. 3A-3B are flow diagrams of a process for securely transferring content from a source device to a target device using an un-trusted host positioned between the source and target devices, in accordance with one embodiment.
Figure 3B:
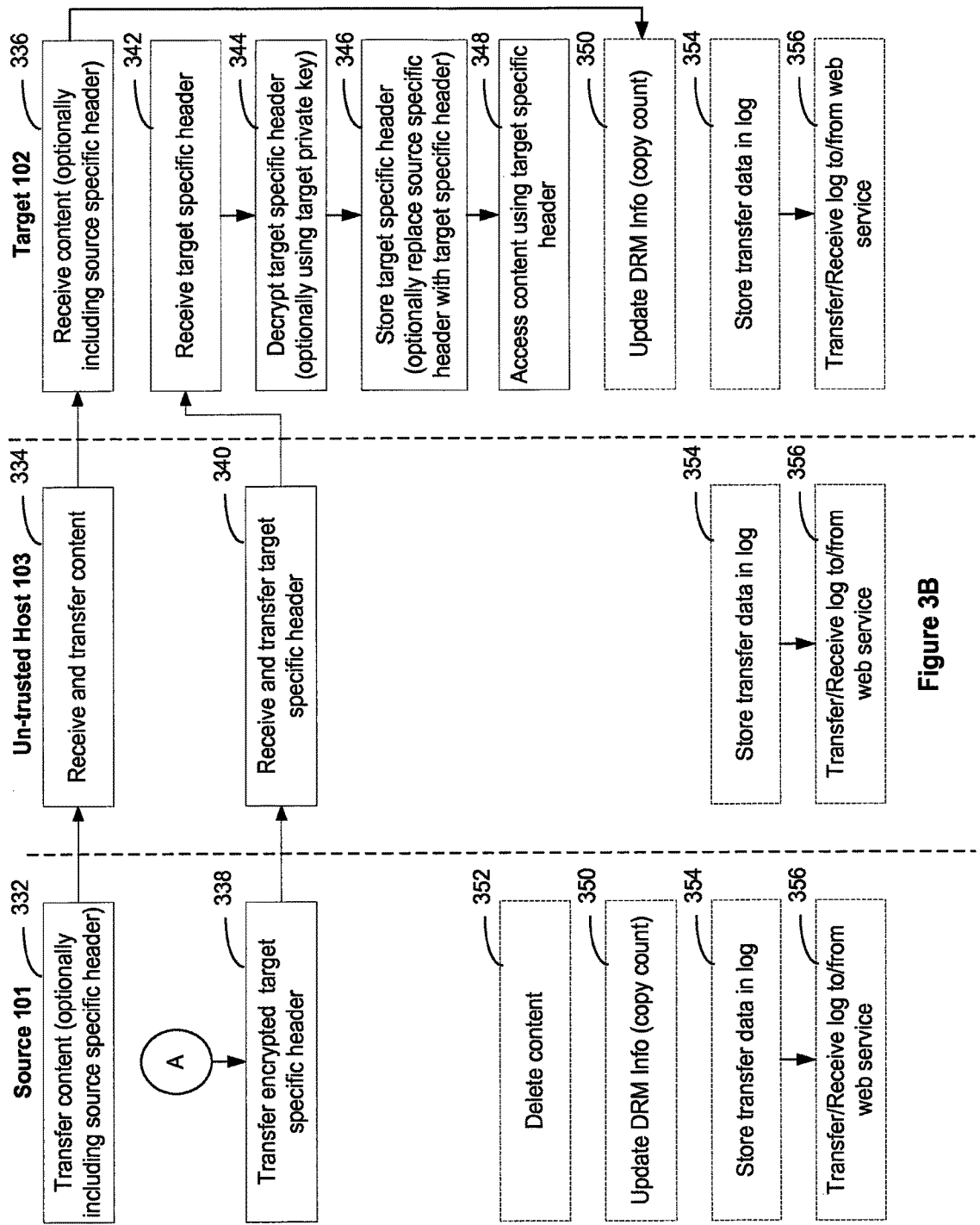

FIGS. 3A-3B are flow diagrams of a process for securely transferring content from a source device 101 to a target device 102 using an un-trusted host 103 in accordance with some embodiments. Typically, the target device 102 is a protected memory device having the same security features (e.g., device signature or serial number) as the source device 101.

The process shown in FIGS. 3A-3B is a computer-implemented method of securely transferring content with digital rights management metadata and/or other security metadata. Optional operations are indicated by dashed lines. In some embodiments, portions of the method are performed by a source device 101 and a target device 102, each having one or more processors (201, FIG. 2) and memory (210, FIG. 2) storing one or more programs which when executed by the one or more processors cause performance of a respective portion of the method. In other embodiments (e.g., embodiments in which target device 102 has limited or no computational ability), some or all of the operations described here as being performed by target device 102 are performed instead by host 103.

Prior to coupling source device 101 to host electronic system 103, source device 101 stores the following: one or more multimedia content files 200 and device signature 206 (such as a manufacturer assigned serial number 60 or identifier). As discussed with reference to FIG. 2, one or more multimedia content files 200 are stored in nonvolatile memory 210, and device signature 206 is typically durably stored elsewhere in source device 101. Each content file 211 includes content 215 and header 205 with digital rights metadata allowing only a device having the device specific signature 206 access to media content 215.

In some embodiments, prior to beginning of any transfer discussed with respect to FIGS. 3-5 both the source device 101 and the target device 102 are validated. The source device 101 is validated to ensure that content 200 from the source device 101 may be transferred or copied. The target device 102 is validated to ensure that it is allowed to receive the content files 200 from the source device 101. For example, the target device validation should ensure that the target device is consistent with the content protection requirements of the content file. In some embodiments, this validation is performed by use of the device signature 206 unique to each device. The device signature 206 of the source device 101 is used to make sure that the source device 101 is a legitimate device to perform the transfer. Likewise, the device signature 206 of the target device 102 is used to make sure that the target device 102 is a legitimate device to perform the transfer. As explained above, in some embodiments, the device signature 206 of a respective device is also used to ensure that a respective content file 211 is allowed to be played by a media player 250 on the device.

Furthermore, in some embodiments, prior to the beginning of transfers discussed with respect to FIGS. 3-5, a list of content files 200 located on the source device 101 is presented to the user via a source device's user interface 203. The user optionally selects some or all of the content files 200 for transfer. (The selection may be done by any conventional means such as a mouse click, touch sensitive screen, or fixed button.) In other embodiments, all of the content files 200 located on the source device 101 will be tentatively scheduled for transferred when the source device 101 is connected to a host, without need of explicit user input. For example, in some embodiments, the names of all of the source device's content files 200 are displayed on a host's display, and the user then selects which content files to transfer 200 using a host's user interface. In some embodiments, if the user does not explicitly select particular content files 200 within a pre-determined period of time, all of the content is scheduled for transfer to the target device 102.

In some embodiments, target device 102 transfers the target device's public key (also herein called the target public key) to source device 101. In some embodiments, the transfer occurs according to the following process: target device 102 transfers the target public key to un-trusted host 103 (302), un-trusted host 103 receives the target public key and transfers the target public key to source device 101 (304), and source device 101 receives and stores the target public key (306).

Similarly, in some embodiments, source device 101 transfers the source device's public key (also herein called the source public key) to target device 102. In some embodiments, the transfer occurs according to the following process: source device 101 transfers the source public key to un-trusted host 103 (308), un-trusted host 103 receives the source public key and transfers the source public key to target device 102 (310), and target device 102 receives and stores source public key (312). In some embodiments, keyed or protected transfers are used instead of the public key transfers described above, and as such these elements are shown in dashed lines indicating that these specific embodiments of secure transfer are optional.

Target device 102 creates a message that includes the target device's signature (314). In some embodiments, the target device's signature is directly related to the target device's serial number (60, FIG. 1). In other embodiments, the target device's signature is an encrypted number associated with target device 102, or a number associated with the target device's private key. Optionally, target device 102 encrypts the message using the source public key (316). In other embodiments, the encryption is done by another means, or the target device signature is secured by a mechanism other than encryption. Target device 102 securely transfers the target device signature to source device 101 by: securely transferring the signature to the un-trusted host (318), which receives the secure signature (in a format that is inaccessible by the un-trusted host) and transfers it to source device 101 (320), such that source device 101 receives the secure target device signature (322).

Source device 101 decrypts the message with the source private key (324) so as to obtain the target device signature from the message. Alternatively, the message is decrypted or read using other means. Source device 101 accesses (326) a respective content file 211 to be transferred to target device 102. Content file 211 has encrypted content and a source-specific header comprising digital rights management metadata (such as one or more of copy count 228, copy rules 280, content key 222). As described above, only a device having the source device signature of source device 101 can access the encrypted content (326). Source device 101 then creates, for the content file to be transferred to target device 102, a target-specific header comprising digital rights management metadata allowing only a device having the target device signature access to the content (328). In some embodiments, creating the target-specific header includes performing a predefined conversion process on the source-specific header to produce the target-specific header. For example, in some embodiments, creating the target-specific header includes decrypting the source-specific header (e.g., using the source device signature, or information corresponding to the source device signature, as the decryption key), and replacing at least a portion of the source-specific header with information corresponding to the target device signature to produce a new header, which is then encrypted (e.g., using the target device signature, or information corresponding to the target device signature, as the encryption key) to produce the target-specific header (330). The target-specific header is encrypted with the target public key (which was received by source device 101 at operation 306), to enable secure transfer of the target-specific header via the un-trusted host 103 to target device 102.

As shown in FIG. 3B, source device 101 transfers the content file to target device 102 by: transferring at least the content of the content file to the un-trusted host (332), which receives the content (in a format that is inaccessible by the un-trusted host) and transfers it to the target (334), such that the target receives the content of the content file (336). Optionally, the entire content file, including the source-specific header, is transferred by source device 101 to target device 102. Since the content file is encrypted, and cannot be used by any device other than one having the content key found in the header, the content file can be transferred before, after or during the transfer of the target public key, source public key, and the target-specific header.

Source device 101 also transfers the encrypted target-specific header to target device 102 by: transferring the encrypted target-specific header to un-trusted host 103 (338), which receives the encrypted target-specific header and transfers it to target device 102 (340).

Target device 102 receives the encrypted target-specific header (342), and decrypts the target-specific header (344) to recover the target-specific header sent by source device 101. Typically, the decryption is done using the target's private key. Alternatively, an encryption-decryption mechanism other than public-private key encryption-decryption can be used. The target device 102 replaces the source-specific header of the received content file with the target-specific header (346). Alternatively, if the source-specific header was not transferred with the content, the target places the target-specific header in the content file. In some embodiments, replacing the source content header includes replacing at least a portion of the source-specific header with information corresponding to the target device signature (e.g., the target-specific header includes the target device signature or information corresponding to the target device signature). Once the source-specific header has been replaced with the target-specific header or the target-specific header has been placed on the target device, the target device can access the content file (348).

In some embodiments, either before or after the transfer is complete, the DRM information for the content file is updated (350). For example, in some embodiments the DRM is updated when the headers are created or updated (i.e., when the target-specific header is created and the source-specific header is updated.) It should be noted that DRM refers to any rules regarding access control. For example, if the DRM includes copy rules that require only one copy of the content to exist, the content is deleted from the source device (352) after it is transferred to the target device. If the DRM includes copy rules that require a copy count, the copy count is incremented. In some embodiments, the copy count is recorded in the source device, the target device, and/or the host and is a part of the data stored in the data log (354) at one or more of the devices. Optionally, the log data is transferred to or from a web service (356) whenever access to that service is available. In some embodiments, the data log transfer (356) occurs at the time of the data transfer process, while in other embodiments the data log transfer is done at a different time such as periodically or upon request by the web service application (203, FIG. 1.)

Optionally, the DRM information is updated according to transfer rules. For example, if an applicable transfer rule limits the number (N) of transfers, e.g., N=10, then the number (M) of transfers in this session is noted or decremented from a transfer count at the source. It is possible to make M transfers to M targets serially or simultaneously. It is also possible to allocate future copies to the target device prior to encrypting the target-specific header. In one example where N=10, when transferring a content file to the target device, DRM information is stored in the target-specific header that allows the target device to make four future transfers of the content file, while the source device retains permissions to make five future transfers.

It should also be noted that while not shown explicitly in FIGS. 3A and 3B, the file transfer process may further include: decrypting the content using a content key; removing source-specific information from the content; adding target-specific information to the content; creating a new content key; encrypting the content with the new content key; and transferring to the target device the encrypted content and the new content key. In some embodiments, the source-specific information is a source watermark and/or source stenographic information, and the target-specific information is a target watermark and/or target stenographic information. These operations are helpful in creating a more secure content file configured for playing only on the target device. These operations are described in more detail below with respect to FIG. 5B, in which they take place in the host device. However, with respect to FIGS. 3A and 3B, the source device 101 is also capable of performing these functions in some embodiments.

Each of the operations shown III FIGS. 3A-3B may correspond to instructions stored in a computer readable storage medium of the source device, the host device, or the target device. As described above, the computer readable storage medium may include a magnetic or optical disk storage device, solid state storage devices such as Flash memory, or other non-volatile memory device or devices. The instructions stored on the computer readable storage medium are in source code, assembly language code, object code, or other instruction format that is executed or interpreted by one or more processors of the source device, the host device, or the target device.

Figure 4A:
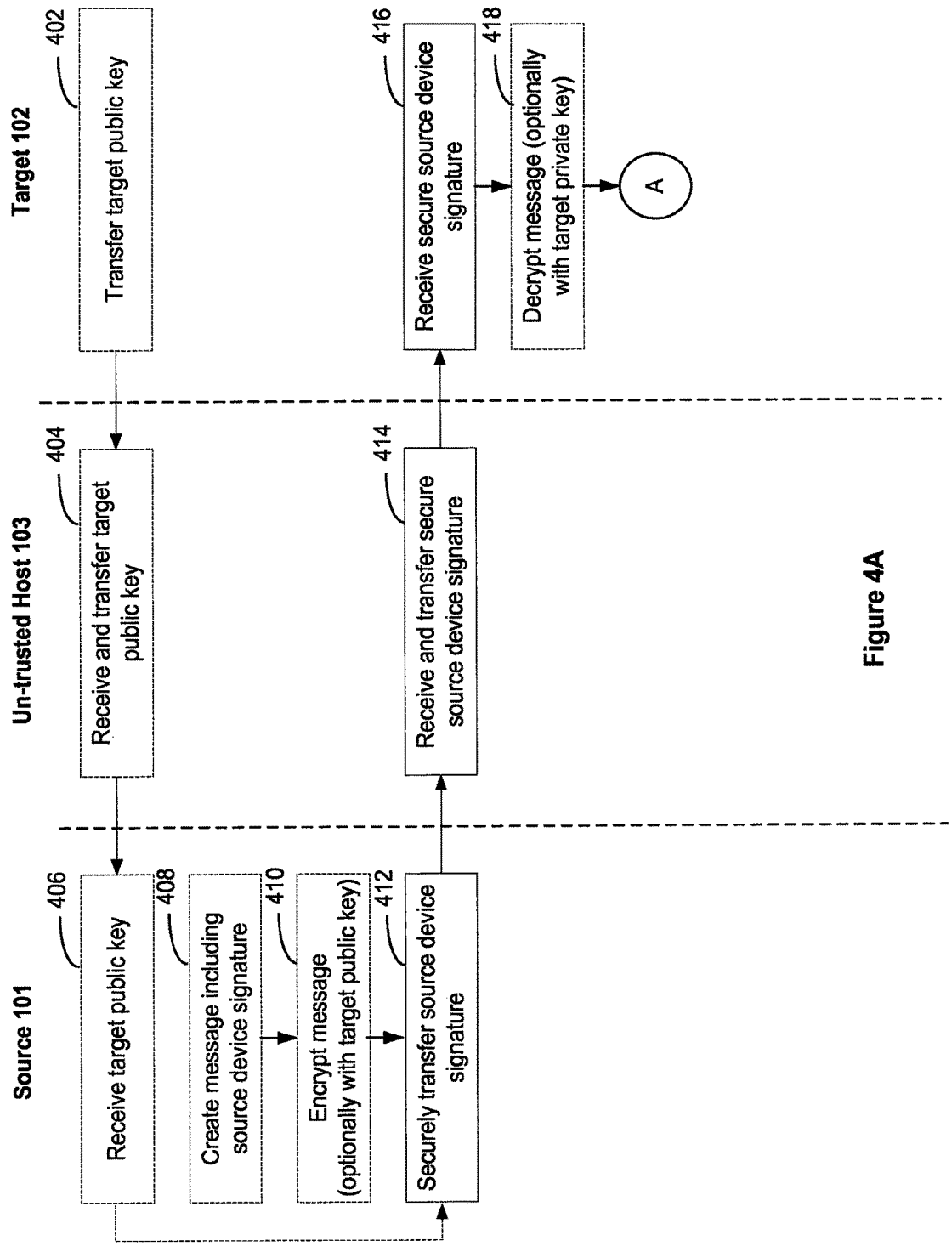
FIGS. 4A-4B are flow diagrams of a process for securely transferring content from a source device to a target device using an un-trusted host there between, in accordance with another embodiment.
Figure 4B:
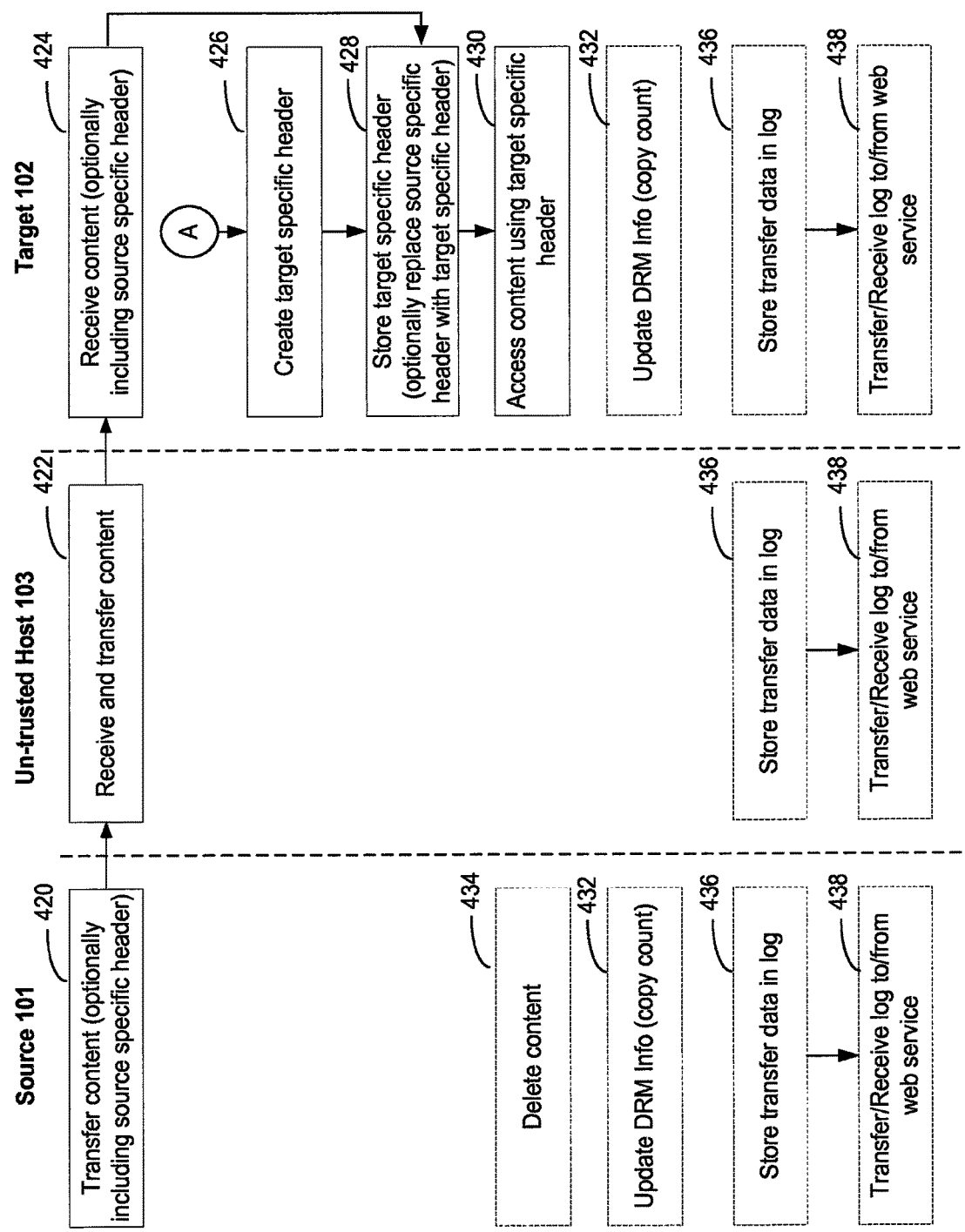

FIGS. 4A-4B are flow diagrams of a process for securely transferring content from source device 101 to target device 102 using an un-trusted host 103. The information provided above, in the discussion of FIGS. 3A-3B, concerning the source device 101, the target device 102, the content file being transferred, the content file's header and content portions, encryption keys, and encryption-decryption methodologies, are equally applicable to the process shown in FIGS. 4A-4B and will therefore not be repeated here.

The process shown in FIGS. 4A-4B is a computer-implemented method of securely transferring content with digital rights management metadata and/or other security metadata. Optional operations are indicated by dashed lines. In some embodiments, portions of the method are performed by a source device 101 and a target device 102, each having one or more processors (201, FIG. 2) and memory (210, FIG. 2) storing one or more programs which when executed by the one or more processors cause performance of a respective portion of the method. In other embodiments (e.g., embodiments in which source device 101 has limited or no computational ability), some or all of the operations described here as being performed by source device 101 are performed instead by host 103.

Prior to coupling source device 101 to host electronic system 103, source device 101 stores the same information as described above with reference to FIG. 3A.

In some embodiments, target device 102 transfers the target device's public key (also herein called the target public key) to source device 101. In some embodiments, the transfer occurs according to the following process: target device 102 transfers the target public key to un-trusted host 103 (402), un-trusted host 103 receives the target public key and transfers the target public key to source device 101 (404), and source device 101 receives and stores the target public key (406).

Source device 101 creates a message that includes the target device's signature (408). In some embodiments, the source device's signature is directly related to the source device's serial number (60, FIG. 1). In other embodiments, the source device's signature is an encrypted number associated with source device 101, or a number associated with the source device's private key. Optionally, source device 101 encrypts the message using the target public key (410). In other embodiments, the encryption is done by another means, or the source device signature is secured by a mechanism other than encryption. Source device 101 securely transfers the source device signature to target device 102 by: securely transferring the signature to the un-trusted host (412), which receives the secure signature (in a format that is inaccessible by the un-trusted host) and transfers it to target device 102 (414), such that target device 102 receives the secure source device signature (416).

As shown in FIG. 4B, the process continues. The source device transfers the content file to the target device by: transferring at least the content of the content file to the un-trusted host (420), which receives the content and transfers it to the target device (422), such that the target device receives the content of the content file (424). Optionally, the entire content file, including the source-specific header, is transferred by source device 101 to target device 102. Since the content file is encrypted, and cannot be used by any device other than one having the source-specific signature, the content file can be transferred before, after or during the transfer of the target public key, source public key, and the target-specific header. Thus, although the target device has a copy of the content file, it cannot access it unless and until it receives the source device signature (as described above).

The target device creates, for the content file, a target-specific header comprising digital rights management metadata allowing only a device having the target device signature access to the content of the content file (426). In some embodiments, creating the target-specific header includes performing a predefined conversion process on the source-specific header to produce the target-specific header. For example, in some embodiments, creating the target-specific header includes decrypting the source-specific header (e.g., using the source device signature, or information corresponding to the source device signature, as the decryption key), replacing at least a portion of the source-specific header with information corresponding to the target device signature to produce a new header, and then encrypting the new header (e.g., using the target device signature, or information corresponding to the target device signature, as the encryption key) with the target device signature (e.g., using the target device signature, or information corresponding to the target device signature, as the encryption key), or information corresponding to the source device signature, as the encryption key. Then the target device replaces the source-specific header of the content file with the target-specific header (428). Alternatively, if the source-specific header was not transferred with the content, the target device places/stores the target-specific header in the content file or in any other suitable location in the target device or accessible to the target device. In some embodiments, replacing the source-specific header includes replacing at least a portion of the source-specific header with information corresponding to the target device signature. Once the source-specific header has been replaced with the target-specific header the target device can access the content file (430).

In some embodiments, either before or after the transfer is complete the DRM information of the transferred content file is updated (432), in the same manner as discussed with respect to FIGS. 3A and 3B. For example, if the DRM includes copy rules that require only one copy of the content to exist, the content is deleted from the source device (434) after it is transferred to the target device. If the DRM includes copy rules that require a copy count, the copy count is incremented. In some embodiments, the copy count is recorded in the source device, the target device, and/or the host and is a part of the data stored in the data log (436) at one or more of the devices. Optionally, log data is transferred to and/or received from a web service (438). In some embodiments, the data log transfer (438) occurs at the time of the data transfer process, while in other embodiments the data log transfer is done at a different time such as periodically or upon request by the web service application (203, FIG. 1.)

It should also be noted that while not shown explicitly in FIGS. 4A and 4B, the file transfer process may further include: decrypting the content using a content key; removing source-specific information from the content; adding target-specific information to the content; creating a new content key; encrypting the content with the new content key; and transferring to the target device the encrypted content and the new content key. In some embodiments, the source-specific information is a source watermark and/or source stenographic information, and the target-specific information is a target watermark and/or target stenographic information. These operations are helpful in creating a more secure content file configured for playing only on the target device 102. For example, encrypting the content with a new content key known only to the target device 102 helps ensure that no device lacking the target device signature, including the source device, will be able to play the new copy of the content file. These steps are described in more detail below with respect to FIG. 5B, in which they take place in the host device. However, with respect to FIGS. 4A and 4B the target device 101 is also capable of performing these functions.

Each of the operations shown in FIGS. 4A-4B may correspond to instructions stored in a computer readable storage medium of the target device, the host device, or the source device. As described above, the computer readable storage medium may include a magnetic or optical disk storage device, solid state storage devices such as Flash memory, or other non-volatile memory device or devices. The instructions stored on the computer readable storage medium are in source code, assembly language code, object code, or other instruction format that is executed or interpreted by one or more processors of the target device, the host device, or the source device.

Figure 5A:
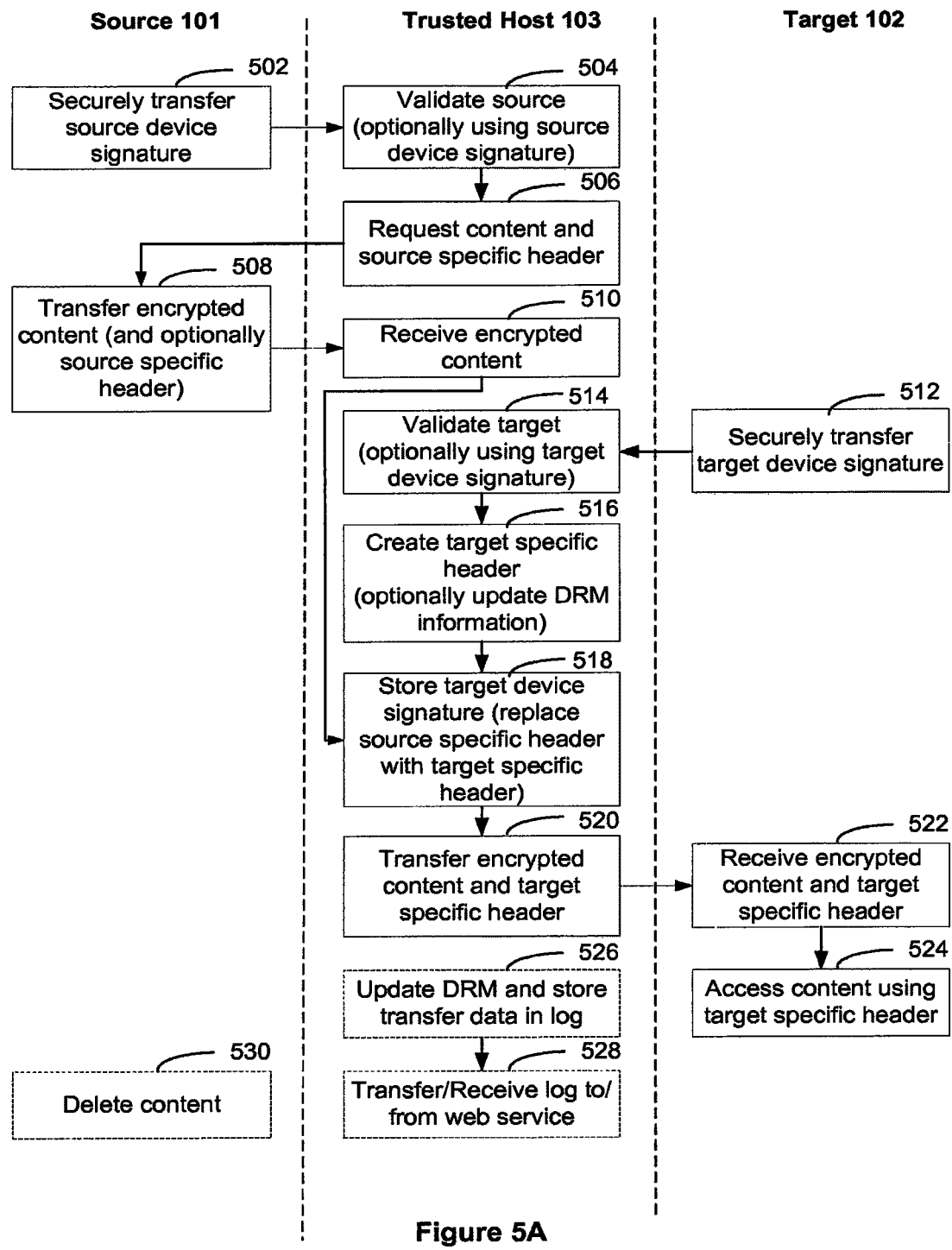
FIG. 5A is a flow diagram of a process for securely transferring content from a source device to a target device using a trusted host there between in accordance with one embodiment.
Figure 5B:
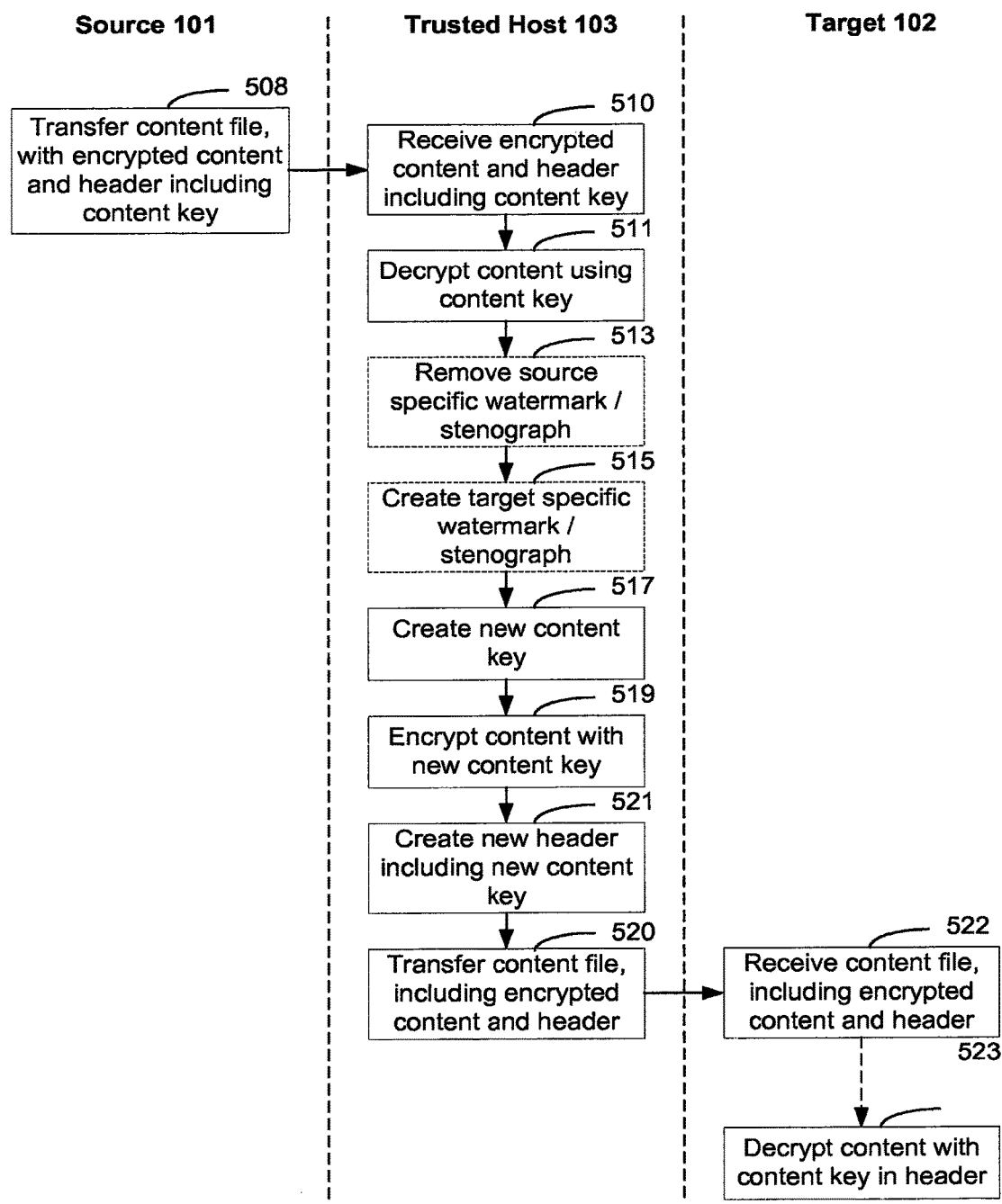
FIG. 5B is a flow diagram of a process for changing a watermark and/or stenograph of a content file, in accordance with one embodiment.

FIGS. 5A-5B are flow diagrams of a computer-implemented process for securely transferring content from a source device 101 to a target device 102 using a trusted host 103. In some implementations both the source device 101 and target device 102 are be coupled to the trusted host 103 at the same time; however, in other implementations, the source and target devices are coupled to the trusted host 103 in sequence. Optionally, multiple target devices are coupled to the trusted host 102 at the same time. Optional operations are indicated by dashed lines. In some embodiments, the trusted host 103 is a secured machine or kiosk located in a public area to facilitate secure data transfer. Methods of securing the trusted host 103 are not described here, as they can be any methods currently known or developed in the future.

The information provided above, in the discussion of FIGS. 3A-3B, concerning the source device 101, the target device 102, the content file being transferred, the content file's header and content portions, encryption keys, and encryption-decryption methodologies, are equally applicable to the process shown in FIGS. 5A-5B and will therefore not be repeated here.

In the embodiments represented by FIGS. 5A-5B, the trusted host 103 does all or almost all of the computations for transferring a content file. As a result, neither the source device 101 nor the target device 102 need to have processors capable of performing encrypt and decryption operations, or they may have more limited processing capabilities than the host device 103. Typically, the source device 101 and the target device 102 need to have a processor or other circuitry capable of conveying data (e.g., a file or a portion of a file) stored in the source device 101 or target device 102 to another device (e.g., host 103) upon request. The target device 102 also needs to have a processor or other circuitry capable of receiving data (e.g., a file or a portion of a file) and storing it in the target device 102, typically in non-volatile storage such as Flash memory in the target device 102.

Prior to coupling source device 101 to host electronic system 103, source device 101 stores the same information as described above with reference to FIG. 3A.

In some embodiments, the source device 101 creates a message that includes the source device's signature and securely transfers it to the trusted host 103 (502). Optionally, the source device encrypts the message in order to securely transfer the signature, or the source device signature is secured by a mechanism other than encryption. The trusted host 103 validates the source device (504). In some embodiments, the source device is validated using the source device's signature. In other embodiments, the source device is validated by another means. It should be noted, that although not shown as an explicit step, in some embodiments the source device 101 is validated in the other transfer mechanisms discussed with respect to FIGS. 3A-3B and 4A-4B as well (although it is validated by the target, not by the host).

Once the source device 101 is validated, the trusted host 103 requests the content file and source-specific header from the source device 101 (506). The source device 101 transfers the content file (and optionally the source-specific header) to the trusted host (508). In some embodiments, the content file is encrypted and includes a source-specific header within it. The source-specific header comprises digital rights management metadata allowing only a device having the source device signature access to the encrypted content. The trusted host 103 receives the encrypted content (and optionally the source-specific header) (510).

At some point during the process, at least before operation 516, but as early as the very beginning of the transfer process, the target device 102 creates a message that includes the target device's signature and securely transfers it to the trusted host (512). Optionally, the target device encrypts the message in order to securely transfer the signature, or the target device signature is secured by a mechanism other than encryption. The trusted host 103 validates the target device (514). In some embodiments, the target device is validated using the target device's signature. In other embodiments, the target device is validated by another means. It should be noted, that although not shown as an explicit step, the target device 101 is validated in the other transfer mechanisms discussed with respect to FIGS. 3A-3B and 4A-4B as well (although it is validated by the source, not by the host).

Once trusted host 103 receives the target device signature, the host's signature and the content file, trusted host 103 creates for the content file a target-specific header comprising digital rights management metadata and/or other security metadata allowing only a device having the target device signature access to the content (516). In some embodiments, creating the target-specific header includes performing a predefined conversion process on the source-specific header to produce the target-specific header. For example, in some embodiments, creating the target-specific header includes decrypting the source-specific header (e.g., using the source device signature, or information corresponding to the source device signature, as the decryption key), replacing at least a portion of the source-specific header with information corresponding to the target device signature to produce a new header, and encrypting the new header with the target device signature (e.g., using the target device signature, or information corresponding to the target device signature, as the encryption key). Then the trusted host 103 replaces the source-specific header of the content file with the target-specific header (518). Alternatively, if the source-specific header was not transferred with the content, the host places/stores the target-specific header in the content file.

Then the trusted host 103 transfers the encrypted content and the target-specific header to the target device 102 (520). The target device 102 receives the encrypted content and the target-specific header (522). Because the source-specific header has been replaced with the target-specific header (or the target-specific header has been placed on the target device) it can access the content file (524).

In some embodiments, either before or after the transfer is complete the DRM information of the transferred content file is updated and information regarding the transfer is stored in a data log (526). In some embodiments, the content (or at least the header which makes the content accessible) is deleted from the source device (530). In some embodiments, the content is deleted at the same time that the source device transfers the content and source-specific header to the trusted host (i.e., at step 508), while in other embodiments the content is not deleted until the content has been successfully transferred to the target device 102. In some embodiments, the copy count is updated and recorded as a part of the data stored in the data log (526). In some embodiments log data is transferred to and/or received from the web service (528). In some embodiments the data log transfer (528) occurs at the time of the data transfer process, while in other embodiments the data log transfer is done at a different time such as periodically or upon request by the web service application (203, FIG. 1).

FIG. 5B introduces optional additional data transfer operations that occur between receiving the content from the source device 101, at operation 510, and transferring the content to the target device 102, at operation 520. These optional operations can also be employed by the source device 101 in the method described in FIGS. 3A-3B, or in the target device 102 in the method described in FIGS. 4A-4B. These additional operations are helpful in creating a more secure content file that has added securities for creating a target-specific content file.

FIG. 5B illustrates, first having the source device transfer encrypted content at step (508), as discussed with respect to FIG. 5A. However, now this step additionally includes transferring a content key in the header (508). The trusted host receives the encrypted content including the content key in the header (510). The trusted host 103 decrypts the content using the content key (511). It removes the source-specific information from the content (513). In some embodiments, this includes removing a source-specific watermark and/or source-specific stenographic information.

The trusted host adds target-specific information to the content (515). In some embodiments, this includes adding a target-specific watermark and/or target-specific stenographic information.

Optionally, the trusted host creates (or otherwise obtains) a new content key (517), encrypts the content of the content file with the new content key (519), and creates a new header including the new content key (521). The new content key is embedded in the header when the source-specific header is replaced with the target-specific header (518, FIG. 5A).

The trusted host 103 transfers the encrypted content file, including its content and header (including the new content key, if any) to the target device 102 (520). The target device receives the encrypted content file (522). The target device is thus in possession of a content file with two or more mechanisms (including not only the target-specific header, but also watermarks and/or stenographs keyed to the target device) allowing only a device with the target device signature access to the content file. When a user of the target device 102 requests access to the transferred content file (e.g., to play a movie or audio program in the content file), the target device 102 decrypts the content using the content key in the header of the content file (523).

Each of the operations shown in FIGS. 5A-5B correspond to instructions stored in a respective computer memory or computer readable storage medium and executed by one or more processors of a respective device (e.g., source device, trusted host, or target device). As described above, the computer readable storage medium may include a magnetic or optical disk storage device, solid state storage devices such as Flash memory, or other nonvolatile memory device or devices. The computer readable instructions stored on the computer readable storage medium are in source code, assembly language code, object code, or other instruction format that is interpreted by the one or more processors of the target device, the host device, or the source device.

Figure 6:
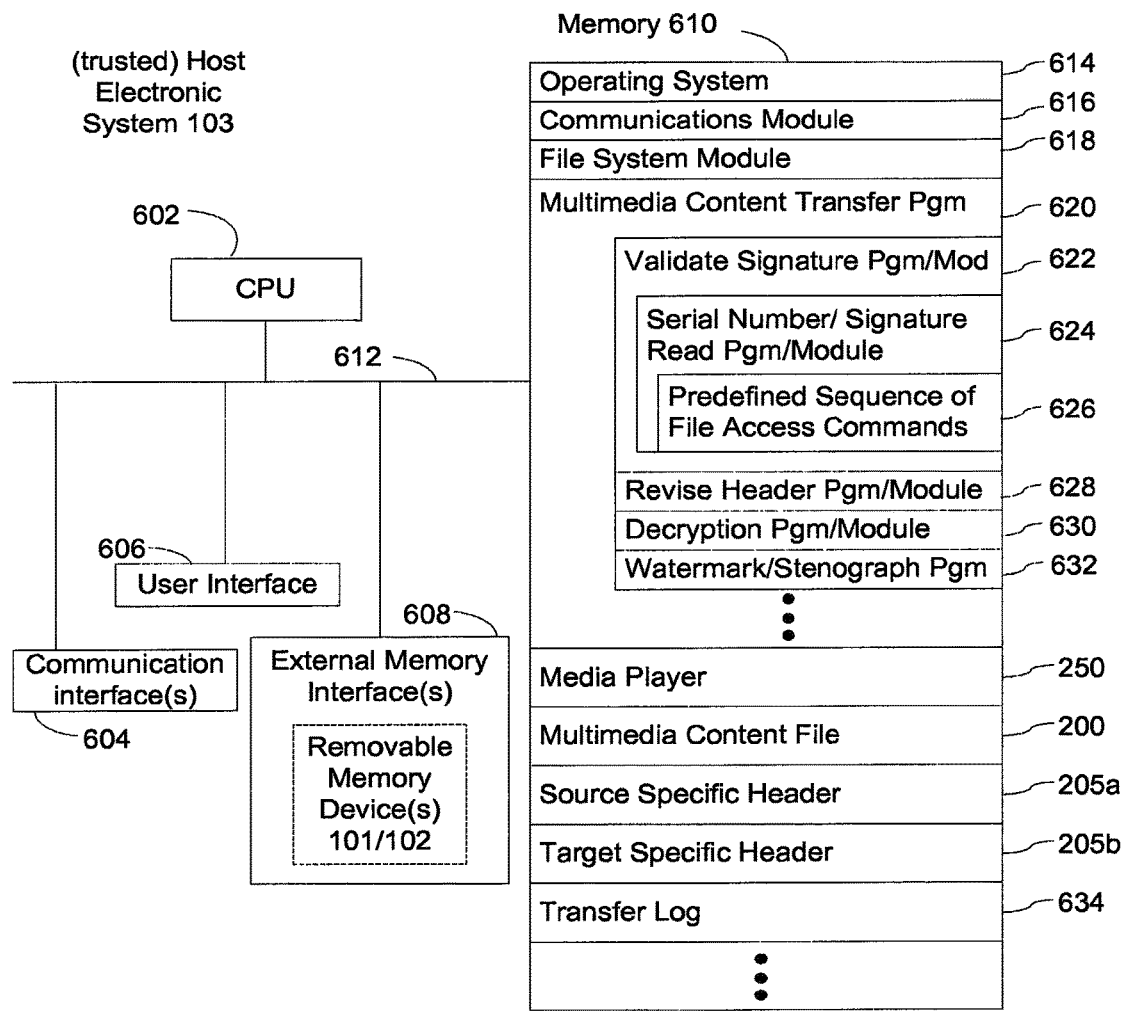
FIG. 6 is a block diagram illustrating an example of a trusted host electronic system.

FIG. 6 is a block diagram of a trusted host electronic system 103, according to certain embodiments. The host electronic system 103 includes one or more processors (CPU's) 602, one or more network or other communications interfaces 604, one or more external communication interface 608 (e.g., physical interface 32 or wireless interface 37, FIG. 1) for communicating with an external protected memory devices (PMOs) 101/102, memory 610, and one or more communication buses 612 for interconnecting these components. The communication buses 612 may include circuitry (sometimes called a chipset) that interconnects and controls communications between system components. The host electronic system 103 typically includes a user interface 606. However, it should be noted that the host electronic system does not necessarily need interface 606 or the computational ability to render the content that it holds. For example, in some embodiments, the host does not play or display the content but merely acts as a repository of the content. In some embodiments, the user interface includes a display device, a keyboard and a pointer device, while in other embodiments (e.g., a cell phone or personal digital assistant) the user interface includes a touch screen display.

Memory 610 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 610 may optionally include one or more storage devices remotely located from the CPU(s) 602. Memory 610, or alternately the non-volatile memory device(s) within memory 610, includes a non-transitory computer readable storage medium. In some embodiments, memory 610 or the computer readable storage medium of memory 610 stores the following programs, modules and data structures, or a subset thereof:

- an operating system 614 that includes procedures for handling various basic system services and for performing hardware dependent tasks;
- a network communications module 616 that is used for connecting the host electronic system 103 to other computers via the one or more communication network interfaces 604 and one or more communication networks, such as the Internet, other wide area networks, local area networks, metropolitan area networks, and so on;
- a file system module 618 for managing data files stored in the host electronic system 103;
- a multimedia content transfer program 620 which comprises various programs/modules used when transferring a protected file from a source device 101 to a target device 102, including: a validate signature module 622 for validating the signatures of the source device 101 and target device 102; the validate signature module optionally includes a serial number reader module 624 for decrypting and reading the source and target device signatures (which may or may not be associated with their serial numbers), which includes a predefined sequence of file access commands 626 accessing the serial number of device signature of a respective source or target device; a revise header program/module 628 for changing source-specific header 205a or a respective file (e.g., content file 211) into target-specific header 205b, a decryption program/module 630 for decrypting encrypted content (signatures, content files, content keys, etc.), an optional watermark/stenograph read/write program/module 632 for removing and re-inserting watermarks and stenographs in content file 211, and possibly other modules (for example, a CRC program or hash function, for computing the CRC or hash value of the content file being transferred and, when receiving a file, confirming that the CRC or hash value matches a CRC or hash value associated with the file (e.g., sent along with the file during transfer from the source device);
- a multimedia content player 250, which is optionally be automatically launched by the host electronic system 103 when PMD 200 is coupled to host electronic system 103; additional details of an exemplary multimedia content player 250 are described above with reference to FIG. 2;
- a multimedia content file 211 received from the source device, or the portions of file 211 received from the source device;
- an optional source-specific header 205a for the multimedia content file; file header 205a is described above with reference to FIG. 2; when file 211 includes source-specific header 205a, only a device having the source device signature can read the file's content;
- a target-specific header 205b for the multimedia content file; file header 205b is described above with reference to FIG. 2; when file 211 includes target-specific header 205a, only a device having the target device signature can read the file's content;
- optionally, a transfer log 634; and
- optionally, other applications, such as a browser application, for execution by host electronic system 103.

Each of the identified programs or modules corresponds to a set of instructions. These programs or modules, when executed by the one or more processors of host electronic system 103, perform the functions or operations described above. The above identified modules or programs (i.e., sets of instructions) need not be implemented as separate software programs, procedures or modules, and thus various subsets of these modules may be combined or otherwise re-arranged in various embodiments. In some embodiments, memory 610 may store a subset of the modules and data structures identified above. Furthermore, memory 610 may store additional modules and data structures not described above.

Although FIG. 6 shows a trusted host electronic system 103, FIG. 6 is intended more as a functional description of the various features than as a structural schematic of the embodiments described herein. In practice, and as recognized by those of ordinary skill in the art, items shown separately could be combined and some items could be separated.

To offer the reader better clarity, two examples are offered. This is intended to offer descriptive narrative rather than be an exhaustive description of the possible implementations and embodiments.

Figure 7:
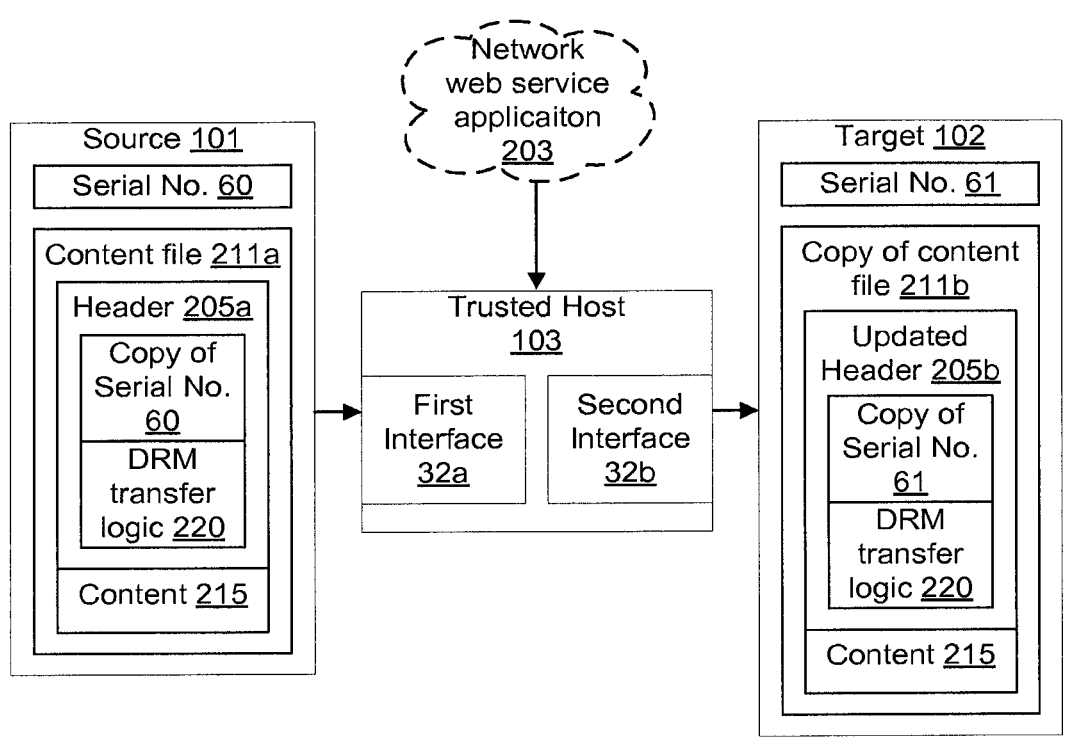
FIG. 7 is a block diagram of a system in which a trusted host coupled to a source device and target device.

In the first example, shown in FIG. 7, a trusted host 103 has two connections for PMDs, one for the source device 101 (first interface 32a) and one for the target device 102 (second interface 32b), and a secure network connection to a web service application 203. Typically, the source device 101 stores a single content file 211 encrypted with, for example, an AES symmetric key system. Optionally, content file 211 contains an identifying watermark and some descriptive stenographic information. In this example, the DRM information (transfer logic) 220 in content file 211 says that this content may be copied no more than ten times (N=10, including the source content file) and that there is currently only one copy (the source content file). Furthermore, the DRM information specifies that a distinct watermark and stenographic information is to accompany each copy of the content file. The distinct stenographic information or watermark might be as simple as the copy version number concatenated to the serial number (or a portion of the serial number) of the device on which copy is stored, for example.

When both source device 101 and target device 102 are connected to host 103, the transfer is started. Optionally, the trusted host 103 displays instructions to the user to facilitate the process of connecting the devices 101 and 102 to the host 103, and optionally requests the user to confirm that a respective content file should be copied from source device 101 to target device 102 prior to starting the file transfer process.

Trusted host 103 determines that the source device is a valid PMD. In some embodiments, it may validate the source device by reading its serial number 60 or device signature 206. For example, the host determines whether the serial number read from the device satisfies a validity check (e.g., if the serial number of is valid, one portion of the serial number is required to be a predefined function of another portion of the serial number) in order to validate the source device. The validity of content file 211a in the source device 101 is determined by decrypting the content header 205a of content file 211a, in this case by the host executing a program provided on source device 101. To validate content file 211a, the device signature copy 206a (e.g., serial number) in content header 205a is matched with the device signature 206 (e.g., serial number 60) of source device 101.

If the two device signatures are in agreement, the file transfer continues. If the two device signatures are not in agreement, the file transfer is aborted (not completed), because either content file 211a is corrupt or the content file was not properly stored on the source device 101 (e.g., content file 211 a might be an unauthorized copy of a file).

Host 103 also determines whether target device 102 is a valid PMD. In some embodiments this is done by reading its serial number 60 or device signature 206, performing the same or similar checks to those described above for the source device serial number. Host 103 furthermore determines whether target device 102 has sufficient available storage also called unused capacity or free storage) in its memory to store the content file, as there is no reason to continue the file transfer process if target device 102 has insufficient available storage.

Upon verifying both source device 101 and target device 102, the validity of content file 211a, and that target device 102 has sufficient available storage to store content file 211, trusted host 103 creates a target-specific header 205b for a new copy of content file 211b, using target device signature 206 (e.g., serial number 60). Details of how a target-specific header is generated are described above. Optionally, DRM transfer logic 220 determines additional operations to be performed on the file's content 215 and header 205 before the new copy of file 211 b is written to target device 102. As noted above, content 215 may be decrypted to enable a watermark and/or stenographic information in content 215 to be replaced with a watermark and/or stenographic information unique to the new copy of file 211, after which content 215 is encrypted using a content key in target-specific header 205b. As noted above, content key in target-specific header 205b may be different from the content key in source-specific header 205a, to ensure that only a device having the target device signature can decrypt the new copy of file 211 b.

New content file 211b, including both header 205b and content 215, IS transferred by trusted host 103 to target device 102.

In this example, the new copy of content file 211b transferred to target device 102 is encoded (i.e., in its DRM information 220) with permissions to make 5 copies (including the transferred copy). DRM information 220 in the header or the source device copy of the content file retains permission to make 5 copies (including the existing copy).

Additionally, the transfer logs on source device 101, target device 102, host 103, and/or the web service are all appended with information concerning the transfer. Optionally, the information added to the transfer log includes information identifying the source and target devices (e.g., a portion of the serial numbers of the source device and target device sufficient to identify the source and target devices), a timestamp for the time that the content file transfer was completed or initiated or timestamps for both, and DRM information (e.g., the number of copies made so far, and/or the number of additional copies left) for the source and target copies of the content file. Optionally, the information added to the transfer log at source device 101, target device 201, host 103 and/or web service includes additional information.

In another example, if host 103 in the system of FIG. 7 has only one available interface 32, host 103 first performs all operations (as described above) required to obtain the source device signature and a copy of file 211a to be transferred while the source device is connected to interface 32; then performs all operations (as described above) required to be make a new copy of file 211 b and write file 211 b to target device 102 while target device 102 connected to interface 32; and finally (and optionally) writes log information to a transfer log in the source device 101 when the source device is again connected to interface 32. Optionally, trusted host 103 displays instructions to the user to facilitate the process of sequentially connecting devices 101 and 102 to host 103, and optionally requests the user to confirm that a respective content file should be copied from source device 101 to target device 102 prior to starting the file transfer process.

Figure 8:
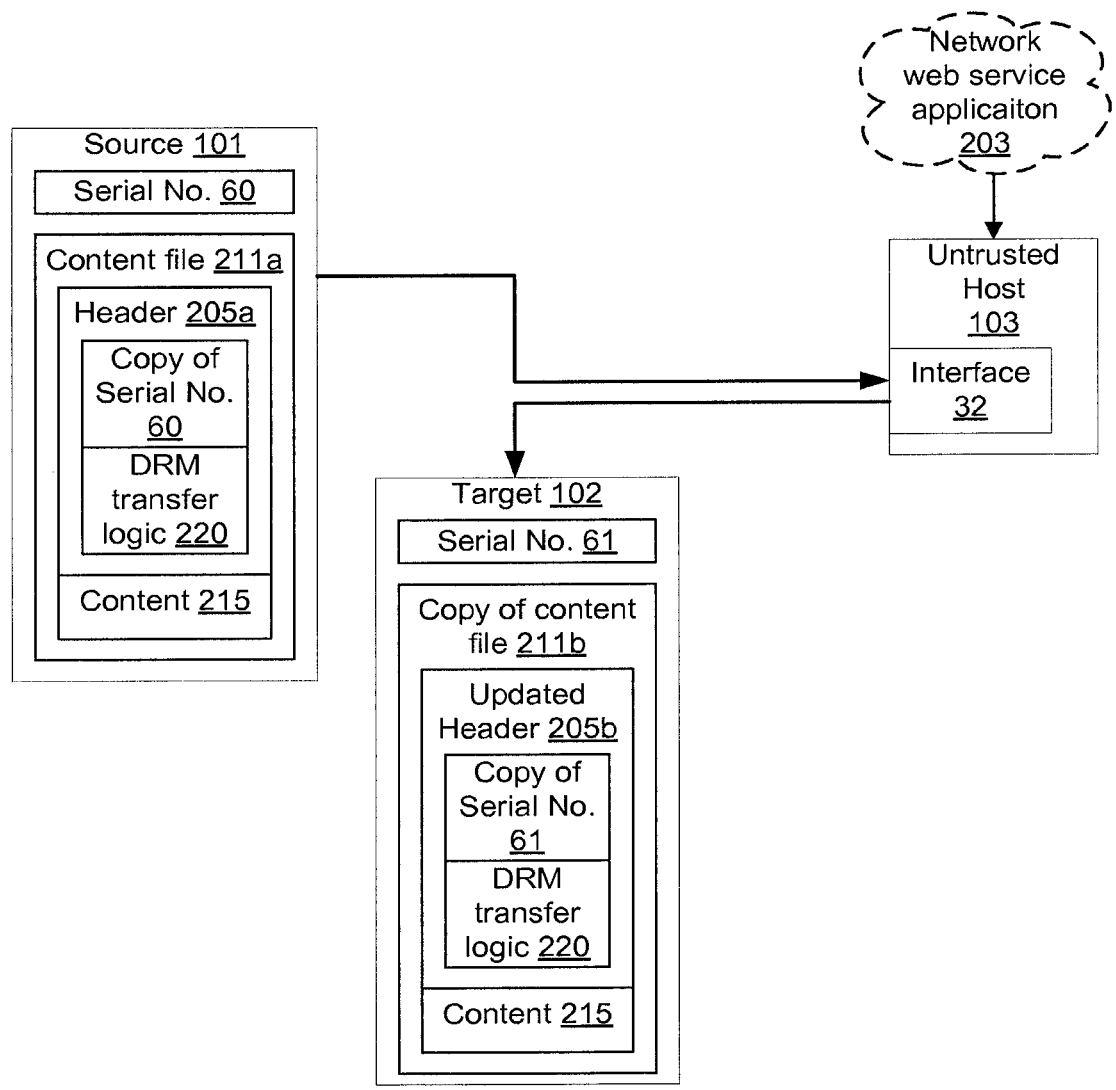
FIG. 8 is a block diagram of a system in which an untrusted host coupled to a source device and target device.

In a second example, shown in FIG. 8, an untrusted host 103 is used (rather than the trusted host in the example of FIG. 7) and the untrusted host 103 has only a single available interface connecting untrusted host 103 to source device 101 and target device 102 (interface 32), and an insecure network connection to a web service application 203. Content file 211 is the same in this example as in the example described above with respect to FIG. 7.

When a user connects source device 101 to the untrusted host's interface the transfer is started. Source device 101 provides both the (encrypted) content file and the source device's public key (of a public/private key encryption system) to host 103.

When the user disconnects source device 101 and connects target device 102 to untrusted host 103, host 103 confirms that the target device has sufficient available storage to store the content file, and transfers the content file without alteration and the source device's public key to target device 102. Target device 102 encrypts the target device signature (e.g., its serial number 60) with the source device public key, and sends a message with the encrypted target device signature to host 103.

When the user disconnects target device 102 and reconnects source device 101 to host 103, host 103 transfers the target's encoded message to source device 101. Source device 101 decrypts the message and uses the target device signature and to create a target-specific header for the content file, and uses the target device's public key to encrypt the target-specific header (or to encrypt a message containing the target-specific header) and sends the encrypted target-specific header to host 103. During this process, any changes to the DRM information in the source copy of the content file and the target copy of the content file are carried out, thereby including updated DRM information in header 205a of the source device copy of content file 211a and in header 205b of the target device copy of content file 211b. Optionally, source device 101 updates a transfer log of source device 101 to include information concerning the transfer of the content file to target device 102. See the discussion above concerning information that may be stored in the transfer log.

When the user disconnects the source device and once again connects target device 102 to host 103, host 103 transfers the new content header to the target device, as described above. Target device 102 completes the process of converting the content file, decrypting the new content header received from host 103, replacing the source-specific header with the target-specific header. Optionally, target device 102 updates a transfer log target device 102 to include information concerning the transfer of the content file to target device 102. See the discussion above concerning information that may be stored in the transfer log.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

We claim:

1. A computer-implemented method of transferring content, performed on a source device having one or more processors and memory storing one or more programs which when executed by the one or more processors cause performance of the method, the method comprising:

receiving from a target device, a target device signature;
accessing a content file having encrypted content and a source-specific header allowing only a device having a source device signature access to the encrypted content, wherein the source device comprises a removable device having non-volatile semiconductor memory storing one or more content files;
decrypting the encrypted content using a content key;
removing source-specific information from the content;
adding target-specific information to the content, wherein the source-specific information is one or more of a source watermark and source stenographic information; wherein the target-specific information is one or more of a target watermark and target stenographic information; wherein the source watermark and the source stenographic information include information unique only to the source; and wherein the target watermark and the target stenographic information include information unique only to the target;
creating a new content key;
encrypting the decrypted content with the new content key to create re-encrypted content;
creating for the content file a target-specific header allowing only a device having the target device signature access to the content;
encrypting the target-specific header; then
transferring to the target device, the content file with the re-encrypted content, the new content key and the encrypted target-specific header.

2. The computer-implemented method of claim 1 wherein the target specific header is created by using a target device signature to convert an intermediate header into the target specific header.

3. A computer-implemented method of transferring content, performed on a source device having one or more processors and memory storing one or more programs which when executed by the one or more processors cause performance of the method, the method comprising:

accessing a content file having encrypted content and a source-specific header allowing only a device having a source device signature access to the encrypted content, wherein the source device comprises a removable device having non-volatile semiconductor memory storing one or more content files, wherein the source device signature is a serial number of the source device, is a value that is a predefined function of the serial number of the source device, or is a set of alphanumeric characters that identify the source device;
removing source-specific information from the content;
adding target-specific information to the content, wherein the source-specific information is one or more of a source watermark and source stenographic information, wherein the target-specific information is one or more of a target watermark and target stenographic information, wherein the source watermark and the source stenographic information include information unique only to the source, and wherein the target watermark and the target stenographic information include information unique only to the target;
creating for the content file a target-specific header allowing only a device having the target device signature access to the content;
encrypting the target-specific header; then
transferring to the target device, the content file with the re-encrypted content and the encrypted target-specific header.

4. The computer-implemented method of claim 3 wherein the target specific header is created by using a target device signature to convert an intermediate header into the target specific header.

5. A source device comprising:

one or more processors and memory storing one or more programs which when executed by the one or more processors cause:
receiving from a target device, a target device signature;
accessing a content file having encrypted content and a source-specific header allowing only a device having a source device signature access to the encrypted content, wherein the source device comprises a removable device having non-volatile semiconductor memory storing one or more content files;
decrypting the encrypted content using a content key;
removing source-specific information from the content;
adding target-specific information to the content, wherein the source-specific information is one or more of a source watermark and source stenographic information; wherein the target-specific information is one or more of a target watermark and target stenographic information; wherein the source watermark and the source stenographic information include information unique only to the source; and wherein the target watermark and the target stenographic information include information unique only to the target;
creating a new content key;
encrypting the decrypted content with the new content key to create re-encrypted content;
creating for the content file a target-specific header allowing only a device having the target device signature access to the content;
encrypting the target-specific header; then
transferring to the target device, the content file with the re-encrypted content, the new content key and the encrypted target-specific header.

6. The source device of claim 5 wherein the source device comprises a physical interface for removably interconnecting or a wireless interface for communicating with a host device.

7. A source device comprising:

one or more processors and memory storing one or more programs which when executed by the one or more processors cause:
accessing a content file having encrypted content and a source-specific header allowing only a device having a source device signature access to the encrypted content, wherein the source device comprises a removable device having non-volatile semiconductor memory storing one or more content files, wherein the source device signature is a serial number of the source device, is a value that is a predefined function of the serial number of the source device, or is a set of alpha-numeric characters that identify the source device;

removing source-specific information from the content;

adding target-specific information to the content, wherein the source-specific information is one or more of a source watermark and source stenographic information, wherein the target-specific information is one or more of a target watermark and target stenographic information, wherein the source watermark and the source stenographic information include information unique only to the source, and wherein the target watermark and the target stenographic information include information unique only to the target;

creating for the content file a target-specific header allowing only a device having the target device signature access to the content;

encrypting the target-specific header; then transferring to the target device, the content file with the re-encrypted content and the encrypted target-specific header.

8. The source device of claim 7 wherein the target specific header is created by using a target device signature to convert an intermediate header into the target specific header.

* * * * *